US012579517B2

(12) United States Patent
Rosenkranz et al.

(10) Patent No.: US 12,579,517 B2
(45) Date of Patent: Mar. 17, 2026

(54) AUTOMATED DESCRIPTION GENERATION FOR JOB POSTING

(71) Applicant: Microsoft Technology Licensing, LLC, Redmond, WA (US)

(72) Inventors: Thomas Rosenkranz, San Francisco, CA (US); Asim Anis, Mountain View, CA (US); Andrew Chimka, San Francisco, CA (US); Daniel K. Hewlett, Clarksville, MD (US); Cho Won Kim, Belmont, CA (US); Zixin Li, San Francisco, CA (US); Hang Li, Cupertino, CA (US); Pierre Monestie, Half Moon Bay, CA (US); Jianqiang Shen, San Mateo, CA (US); Deanne Moree Chan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/328,667

(22) Filed: Jun. 2, 2023

(65) Prior Publication Data

US 2024/0296425 A1     Sep. 5, 2024

Related U.S. Application Data

(60) Provisional application No. 63/488,376, filed on Mar. 3, 2023.

(51) Int. Cl.
*G06Q 10/1053* (2023.01)
*G06F 16/9535* (2019.01)
(Continued)

(52) U.S. Cl.
CPC ..... *G06Q 10/1053* (2013.01); *G06F 16/9535* (2019.01); *G06F 40/166* (2020.01);
(Continued)

(58) Field of Classification Search
CPC . G06Q 10/1053; G06F 40/194; G06F 40/166; G06F 40/40; G06F 40/197
(Continued)

(56) References Cited

U.S. PATENT DOCUMENTS 11,373,146 B1 *   6/2022   Yerastov ................ G06N 20/00
11,797,780 B1 *  10/2023   Finegan ................ G06F 40/216
(Continued)

OTHER PUBLICATIONS

C. Qin et al., "Towards Automatic Job Description Generation With Capability-Aware Neural Networks," in IEEE Transactions on Knowledge and Data Engineering, vol. 35, No. 5, pp. 5341-5355, May 1, 2023, doi: 10.1109/TKDE.2022.3145396. (Year: 2023).*
(Continued)

*Primary Examiner* — Kieu D Vu
*Assistant Examiner* — Nicholas Hasty
(74) *Attorney, Agent, or Firm* — Nicholson De Vos Webster & Elliott LLP

(57) ABSTRACT

Embodiments of the described technologies receive, via a user interface, an input associated with a first user of a user connection network. The input identifies first position data related to a position capable of being filled by a hiring of a person. In response to validating the first position data, second position data different from the first position data is extracted from the user connection network, based on the first position data. A first prompt is formulated based on the first position data and the second position data. The first prompt is sent to a generative language model. A first piece of writing is received from the generative language model. The first piece of writing includes a position description output by the generative language model based on the first prompt. The position description is sent to the user interface in response to the input.

20 Claims, 15 Drawing Sheets

(51) Int. Cl.
  G06F 40/166        (2020.01)
  G06F 40/194        (2020.01)
  G06F 40/197        (2020.01)
  G06F 40/40         (2020.01)

(52) U.S. Cl.
  CPC .......... G06F 40/194 (2020.01); G06F 40/197 (2020.01); G06F 40/40 (2020.01)

(58) Field of Classification Search
  USPC ........................................................ 715/229
  See application file for complete search history.

(56)                References Cited

U.S. PATENT DOCUMENTS

| | | | | | |
|---|---|---|---|---|---|
| 2014/0032435 | A1* | 1/2014 | Desai | ...................... | G06Q 50/01 |
| | | | | | 705/321 |
| 2014/0279622 | A1* | 9/2014 | Lamoureux | ............ | G06Q 50/01 |
| | | | | | 705/319 |
| 2017/0076225 | A1* | 3/2017 | Zhang | ................... | G06Q 10/063 |
| 2021/0248324 | A1* | 8/2021 | Choudhary | ........... | G06F 40/216 |
| 2022/0261766 | A1* | 8/2022 | George | .............. | G06Q 10/1053 |
| 2023/0004941 | A1 | 1/2023 | Yerastov | | |
| 2023/0131236 | A1* | 4/2023 | Khan | ................. | G06Q 10/1053 |
| | | | | | 705/321 |
| 2024/0273309 | A1* | 8/2024 | Heller | .................... | G06F 40/56 |

OTHER PUBLICATIONS

Liting Liu, et al. 2020. "Hiring Now: A Skill-Aware Multi-Attention Model for Job Posting Generation". In Proceedings of the 58th Annual Meeting of the Association for Computational Linguistics, pp. 3096-3104, Online. Association for Computational linguistics (Year: 2020).*

International Search Report and Written Opinion received for PCT Application No. PCT/US2024/018243, May 3, 2024, 14 pages.

* cited by examiner

900

DESCRIPTION GENERATION SYSTEM  _840_

ENTITY SELECTION SUBSYSTEM —902

Selected Entity —904

INFERRED DATA GENERATION SUBSYSTEM —906

Explicit Data and Inferred Data —908     910

PROMPT GENERATION SUBSYSTEM

914     Prompt —912

DESCRIPTION GENERATION SUBSYSTEM

Description —916     918     920—

—930     PRE-DISTRIBUTION FEEDBACK SUBSYSTEM     Pre-Publication Feedback

Edited Description —922

DESCRIPTION DISTRIBUTION SUBSYSTEM —924

Distributed Description —926

Post Publication Feedback     POST-DISTRIBUTION FEEDBACK SUBSYSTEM —928

PROMPT GENERATION SUBSYSTEM
910

510

ENTITY GRAPH

KNOWLEDGE GRAPH ―512

885―

PROMPT DATA STORE

Explicit Position-
Related Data

1102

1104― INFERRED DATA GENERATOR

Position-Related Data

1106

1108

PROMPT TEMPLATE SELECTOR

Selected Prompt Template

―1110

1106

Position-
Related Data

1112― PROMPT GENERATOR

Prompt ―1114

Scores

1122―

1116― FEEDBACK PROCESSOR

Prompt Feedback

1118

1120

PROMPT TUNER

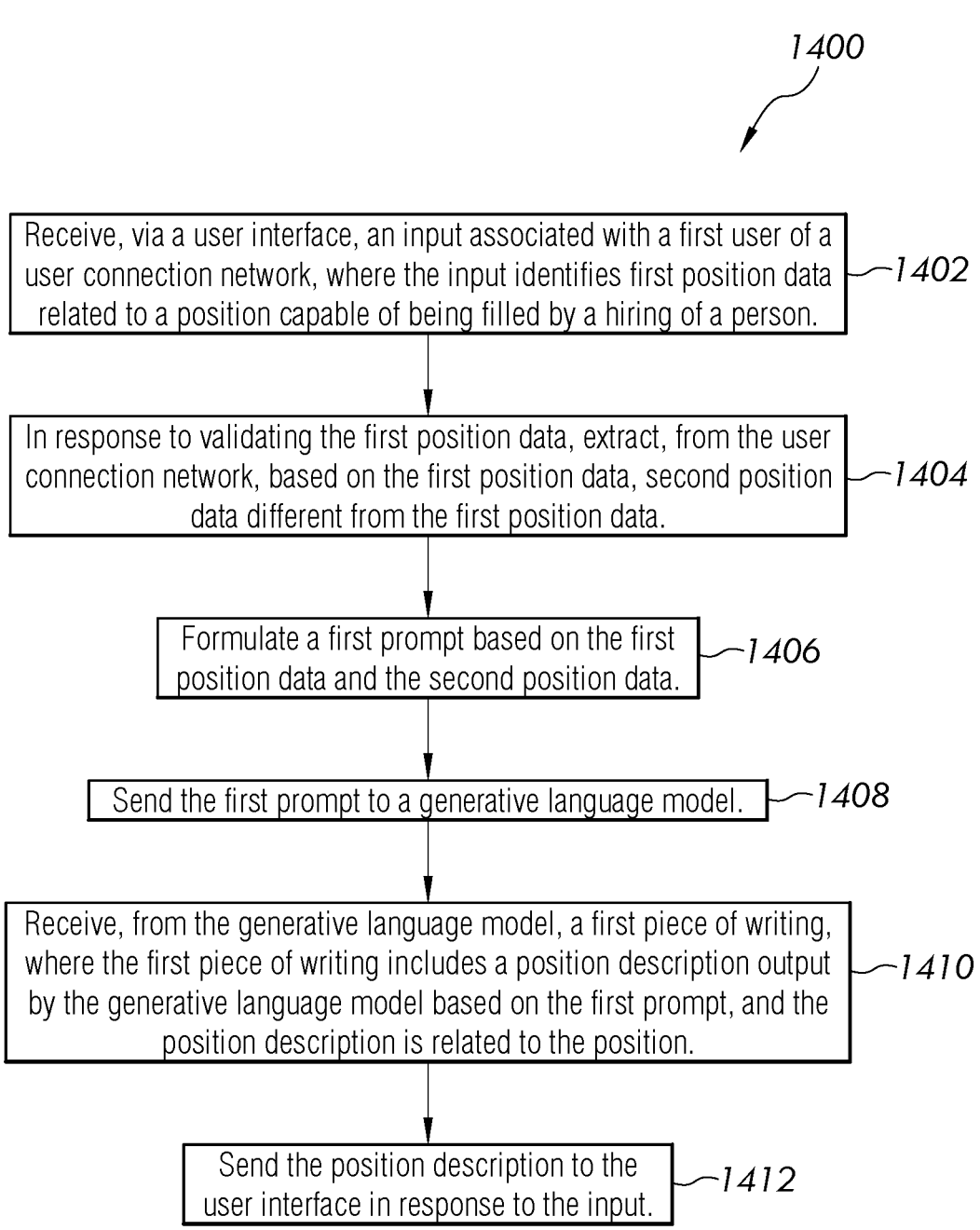

*1400*

Receive, via a user interface, an input associated with a first user of a user connection network, where the input identifies first position data related to a position capable of being filled by a hiring of a person.    —*1402*

In response to validating the first position data, extract, from the user connection network, based on the first position data, second position data different from the first position data.    —*1404*

Formulate a first prompt based on the first position data and the second position data.    —*1406*

Send the first prompt to a generative language model.    —*1408*

Receive, from the generative language model, a first piece of writing, where the first piece of writing includes a position description output by the generative language model based on the first prompt, and the position description is related to the position.    —*1410*

Send the position description to the user interface in response to the input.    —*1412*

FIG. 14

AUTOMATED DESCRIPTION GENERATION FOR JOB POSTING

CROSS-REFERENCE TO RELATED APPLICATIONS

The present application claims the benefit under 35 U.S.C. § 119(e) of U.S. Provisional Patent Application Ser. No. 63/488,376 filed Mar. 3, 2023, which is incorporated herein by this reference in its entirety.

TECHNICAL FIELD

A technical field to which the present disclosure relates is the generation and distribution of digital content, such as job postings, through online systems. Another technical field to which the present disclosure relates is automated content generation using artificial intelligence.

Copyright Notice

This patent document, including the accompanying drawings, contains material that is subject to copyright protection. The copyright owner has no objection to the facsimile reproduction of this patent document, as it appears in the publicly accessible records of the United States Patent and Trademark Office, for the purpose of viewing its content, but otherwise reserves all copyright rights whatsoever.

BACKGROUND

Software applications can use computer networks to distribute digital content among computing devices on a very large scale. Online systems can regularly receive and distribute millions of content items to hundreds of millions of user devices worldwide, every day. The content items received and distributed by online systems can include text, images, audio, video, and combinations of different forms of digital content. Currently, research and experimentation are being done on the use of artificial intelligence technologies to automatically generate digital content items.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 9 is a flow diagram of an example method for automated description generation using components of a description generation system in accordance with some embodiments of the present disclosure.

FIG. 14 is a flow diagram of an example method for automated description generation in accordance with some embodiments of the present disclosure.

DETAILED DESCRIPTION

Figure 1:
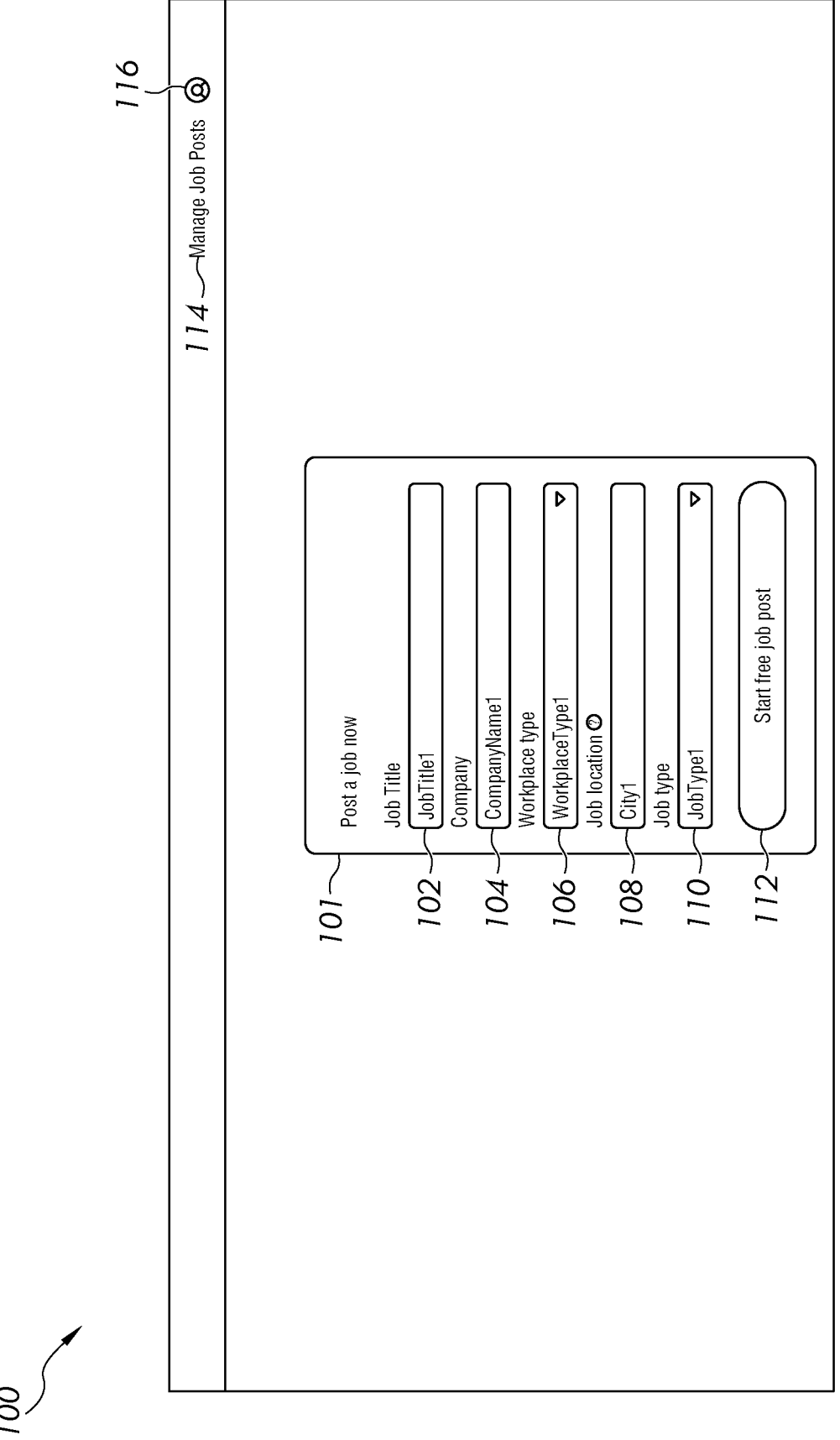
FIG. 1 illustrates an example of a screen capture of a user interface to create a digital job posting in accordance with some embodiments of the present disclosure.

Many people search the Internet to find jobs. Job as used herein may refer to a paid or unpaid position that can be filled by a hiring of a person by, for instance, a company, an organization, an institution, an individual, or a group, e.g., as an employee, a consultant, a contractor, an officer, a director, an administrator, or an executive. For example, internships, residencies, gigs, and volunteer positions, whether paid or unpaid, are considered jobs or positions in some implementations of the disclosed technologies. Job and position may be used interchangeably herein to refer to various types of paid or unpaid roles, responsibilities, assignments, and opportunities that can be filled by people.

While there are many employment-related websites to choose from, the success of an Internet-based job search depends heavily on the online availability of job postings that are relevant to a given search. Job postings can be created by, for example, a user, such as a hiring manager, inputting information about a job into a database via a digital, e.g., online, form hosted by a job site.

Job site as used herein may refer to a web site, Internet-based software application and/or search engine that is designed to enable hiring entities to create job postings, and to allow job seekers to find and apply for jobs that match particular search criteria. Job site, job system, job search, job service, job posting system, and similar terminology may be used interchangeably herein to refer to an application software system that provides job posting and job searching capabilities alone or in combination with other functionality. For example, some application systems provide both a jobs platform and other functionality including a user connection network (e.g., a professional social network service), among other services. For instance, in some application systems, the jobs platform and the user connection network are capable of being interconnected such that data can be passed between the systems via interfaces that are supported by the application system's unique, proprietary, cross-application, dynamic knowledge graph.

The information needed to complete a job posting includes a description of the job for which candidates are being sought. Conventionally, job sites require the user creating the job posting, who may be referred to herein as a job poster or job-posting user, to compose the job description. Some conventional job sites attempt to make this task easier for the job-posting user by allowing the user to store job descriptions that the user has created previously so that any one of those previously-created descriptions can function as a template or starting point for the creation of a subsequent job posting by the user.

This conventional approach may work well for some users, such as those at large companies who are dedicated hiring managers regularly generating high volumes of job postings, but is especially not helpful for new hiring managers, inexperienced job posters, and busy individuals who are tasked with multiple diverse responsibilities in addition to addressing hiring needs. For example, new hiring managers and inexperienced job posters may not have a library of previously-created descriptions to draw from, and busy individuals may not have time to sift through previous examples and make the modifications needed for the new posting. Particularly in smaller companies, employees may perform multiple different roles and may be in charge of generating job postings even if they do not have previous hiring experience or expertise in that area.

When no prior examples of job descriptions are available, or when so many examples are available that it's time consuming to select the most relevant example, new, inexperienced, and multi-tasking job posters often struggle with completing the job posting and may even give up before the job description is posted. When a job is not posted, it is not accessible to job seekers using an application software system, e.g., online job seekers. Consequently, potentially qualified job seekers remain unaware of the job opportunity. As a result, the usage and utility of the job site is suboptimal, particularly for smaller companies and new, inexperienced, or busy job posters. The jobs platform can't be leveraged to identify job candidates and fill jobs if the software makes it too hard for job posters to create and complete the job descriptions.

Even experienced users may struggle with the creation of job descriptions. This is so because hiring needs can evolve rapidly due to business changes or technological advancements that render previously-created job descriptions inapplicable or even obsolete. Dedicated hiring managers and new, busy, or inexperienced users alike may not be aware of the latest skills, experience, or other qualifications that would be desirable for an emerging new job role. When job postings contain inaccurate or outdated job descriptions, the usage and utility of the job site is suboptimal because the job site can't be leveraged to identify the ideal candidates for the jobs that need to be filled.

The barriers to using job sites effectively to identify candidates and fill jobs can prevent businesses from achieving peak productivity and delay the achievement of other business objectives as well. In view of these and other issues, ultimately, ineffective jobs platforms can adversely impact local and regional economies by failing to match qualified candidates with relevant job opportunities. Accordingly, there is a need for job software to improve and better facilitate the process of creating digital job postings.

In contrast to the conventional wisdom regarding generative models, discussed below, this disclosure describes a non-intuitive application of generative models in which the disclosed technologies apply a generative model to the generation of job descriptions for digital job postings. In some implementations, a user connection network is leveraged to generate inferred data that can be used to supplement explicitly provided position-related data in the formulation of a prompt for a generative language model. Additional details of the disclosed technologies are provided below. Examples of position-related data include job titles, skill keywords, industry names, education descriptions (e.g., degrees earned), and company descriptions.

A generative model uses artificial intelligence technology to machine-generate new digital content based on model inputs and the previously existing data with which the model has been trained. Whereas discriminative models are based on conditional probabilities $P(y|x)$, that is, the probability of an output y given an input x (e.g., is this a photo of a dog?), generative models capture joint probabilities $P(x, y)$, that is, the likelihood of x and y occurring together (e.g., given this photo of a dog and an unknown person, what is the likelihood that the person is the dog's owner, Sam?).

A generative language model is a particular type of generative model that generates new text in response to model input. The model input includes a task description, also referred to as a prompt. The task description can include an instruction and/or an example of digital content. A task description can be in the form of natural language text, such as a question or a statement, and can include non-text forms of content, such as digital imagery and digital audio. In some implementations, an input layer of the generative language model converts the task description to an embedding or a set of embeddings. In other implementations, the embedding or embeddings are generated based on the task description by a pre-processor, and then the embeddings are input to the generative language model.

Given a task description, a generative model can generate a set of task description-output pairs, where each pair contains a different output. In some implementations, the generative model assigns a score to each of the generated task description-output pairs. The output in a given task description-output pair contains text that is generated by the model rather than provided to the model as an input.

The score associated by the model with a given task description-output pair represents a probabilistic or statistical likelihood of there being a relationship between the output and the corresponding task description in the task description-output pair. For example, given an image of an animal and an unknown person, a generative model could generate the following task description-output pairs and associated scores: [what is this a picture of ?; this is a picture of a dog playing with a young boy near a lake; 0.9], [what is this a picture of ?; this is a picture of a dog walking with an old woman on a beach; 0.1]. The higher score of 0.9 indicates a higher likelihood that the picture shows a dog playing with a young boy near a lake rather than a dog walking with an old woman on a beach. The score for a given task description-output pair is dependent upon the way the generative model has been trained and the data used to perform the model training. The generative model can sort the task description-output pairs by score and output only the pair or pairs with the top k scores, where k is a positive integer that represents the desired number of pairs to be returned for a particular design or implementation of the generative model. For example, the model could discard the lower-scoring pairs and only output the top-scoring pair as its final output.

Generative language models have many potential uses. However, there are shortcomings that present technical challenges to the widespread use of the conventional generative language models for generating highly customized content, such as descriptions, and more specifically, job descriptions. Conventional generative language models require a significant amount of human intervention for many reasons. Human review of the output of the conventional generative language models is necessary to ensure that model output does not diverge from a given task description in a way that introduces irrelevant or inconsistent information. Further, the output of the conventional generative language models needs substantial human revision to avoid sounding robotic and instead sound more like human-generated writing. Given these and other shortcomings, the conventional generative language models rely heavily on human labor to generate task descriptions in a highly manual, trial-and-error manner.

Additionally, some generative models have limits on the length or size of the inputs (e.g., data included in the task description) that the models can receive or otherwise constrain the input parameter values. These limits can impact the quality of the model output, particularly if the task description is not well-designed. Quality as used herein may refer to an objective determination such as a machine-determined difference between an expected model output and an actual model output, which also may be referred to as loss. In conventional generative language model systems, determining what constitutes a well-designed task description is a trial-and-error process that involves a human engineer formulating task descriptions, observing model outputs, and modifying the task descriptions based on the model outputs. Further, training a generative model is a resource intensive process that involves time-consuming experimentation conducted by human engineers to generate training data and requires subject matter expertise to configure the model architecture and hyperparameters to produce reliable output for real world tasks.

In view of the above-described issues with conventional generative language models, conventional wisdom would normally suggest that generative language models would not be a good choice for addressing the needs of job sites and job posting systems mentioned above. For example, conventional generative language models have not performed well when tasked with generating a highly customized output, such as a job description. Further, conventional generative language models have struggled to generate output in a format that can be readily presented to human users in an easily consumable way, e.g., so that the writing reflects the intentions of the human job poster, presents the role in an appealing way to qualified candidates, is written in a tone, style, or structure that reflects the culture of the hiring company, and flows according to a logical progression of topics and sub-topics.

Additionally, training a conventional generative language model for a specific task is a technical challenge because conventional generative language models limit or cap the size or length of the task description. For example, conventional generative language models can only receive a limited number of parameters in the task description and/or set a maximum length for the task description. As a result, it is important for the inputs used as the parameter values in the task description to be carefully selected, and for the remaining portions of the task description to be carefully constructed, in order for the models to produce the desired output with minimal need for human modification of the machine-generated output.

In the specific context of job description generation for digital job postings, the above-described limitations of generative models present a technical challenge of how to configure a task description for a generative language model so that the generative model outputs a job description that is customized to the needs and intentions of the job poster, especially in cases where only minimal user input is available or the required amount of user input is sought to be minimized.

Automated description generation technologies described herein include a number of different components that alone or in combination address the above and other shortcomings of the conventional job posting technologies because, for example, they can be applied to automated job description generation for previously unseen jobs for which no previously-created job descriptions exist. As described in more detail below, embodiments of a description generation system include one or more of the following components: an entity selection subsystem, an inferred data generation subsystem, a prompt generation subsystem, a description generation subsystem, a pre-distribution feedback subsystem, a description distribution subsystem, and a post-distribution feedback subsystem.

The entity selection subsystem is capable of identifying target users who may be likely to benefit the most from automated job description generation, such as users who previously have left job postings incomplete, users who do not have any stored job description templates, and first-time users of a job posting system. Given a small amount of position-related data explicitly provided by a job posting user, for example only a job title, the inferred data generation subsystem is capable of determining additional parameter values that have not been explicitly specified by the job posting user. These additional, system-inferred parameter values are included in a prompt for a generative language model, to improve the likelihood that the prompt will cause a generative language model (GLM) to output a job description that both meets the requirements of the job poster and needs only minimal human review.

Based on the explicit position-related data (e.g., job title) and inferred position-related data (e.g., skill keywords), the prompt generation subsystem is capable of generating the prompts, which are subsequently input to the generative language model to cause the GLM to output a job description based on the explicit and inferred position-related data. The description generation subsystem is capable of using a trained GLM to machine-generate job descriptions based on the prompts. The description distribution subsystem is capable of distributing job postings containing the GLM-generated job descriptions to users of job sites, job posting systems, and/or other application software systems. As used herein, job posting may refer to a job description (or position description) alone or in combination with other data, such as metadata used by the jobs platform to determine how to digitally distribute the job description to a user network. For example, metadata could include uniform resource names (URNs) or other references or links for, e.g., web pages or feeds to which the job description is to be posted.

The pre-distribution feedback subsystem and the post-distribution feedback subsystem each are capable of generating output that can act as proxies for the expected output of the GLM or as labels or scores for the actual GLM output. Pre-publication feedback and/or post-publication feedback can be used to measure the quality of machine-generated job descriptions output by the GLM and to improve the quality of subsequent GLM output. For instance, some or all of the output of the pre-publication feedback subsystem and/or the feedback generated by the post-publication feedback subsystem are returned to the prompt generation subsystem to refine prompts to improve subsequent GLM output based on the refined prompts.

Additionally or alternatively, feedback generated by the pre-publication feedback subsystem and/or the post-publication feedback subsystem are provided to the description generation subsystem to fine tune the GLM itself. For example, the description generation system can use the pre-publication feedback and/or the post-publication feedback to generate training data on the fly, in an automated way, and use that training data to further improve the prompts and/or to fine tune the GLM itself. As a result of these and other aspects of the described description generation system, at least some of the GLM-produced job descriptions can be included in job postings and distributed by an application software system, e.g., an online system, with minimal human intervention.

Aspects of the disclosed technologies are described in the context of generative language models that output pieces of writing, i.e., natural language text. However, the disclosed technologies are not limited to uses in connection with text output. For example, aspects of the disclosed technologies can be used in connect with non-text forms of machine-generated output, such as digital imagery, videos, and/or audio output by one or more generative models.

Additionally, aspects of the disclosed technologies are described in the context of job descriptions, job sites and job posting systems. However, aspects of the disclosed technologies are not limited to job descriptions, job sites and job posting systems, but can be used to improve the generation of other types of descriptions for other applications. Further, any network-based application software system can act as a description distribution system. For example, news, entertainment, and e-commerce apps installed on mobile devices, enterprise systems, messaging systems, search engines, document management systems, collaboration tools, and social graph-based applications can all function as description distribution systems.

The disclosure will be understood more fully from the detailed description given below, which references the accompanying drawings. The detailed description of the drawings is for explanation and understanding, and should not be taken to limit the disclosure to the specific embodiments described.

FIG. 1, FIG. 2, FIG. 3, and FIG. 4 illustrate examples of user interface screens that can be used to facilitate digital job description creation using automated description generation technologies described herein, for example within a job system. The graphical user interface control elements (e.g., fields, boxes, buttons, etc.) are implemented via software used to construct the user interface screens. While FIG. 1, FIG. 2, FIG. 3, and FIG. 4 illustrate examples of user interface screens, e.g., visual displays such as digital, e.g., online forms, this disclosure is not limited to online form implementations, visual displays, or graphical user interfaces. In other implementations, for instance, an automated chatbot is used in place of a fill-in form, where the chatbot requests the user to input the requested information via a conversational, natural language dialog or message-based format using text and/or spoken-language digital audio received via a microphone embedded in a computing device.

FIG. 1 illustrates an example of a screen capture of a user interface to create a digital job posting in accordance with some embodiments of the present disclosure. The user interface 100 of FIG. 1 is presented by an application software system, such as a job posting system, to a user who wants to create a digital, e.g., online, job posting. In some implementations, the user interface 100 is implemented as a web page that is stored, e.g., at a server or in a cache of a user device, and then loaded into a display of a user device via the user device sending a page load request to the server.

The user interface 100 includes a window 101 that requests (e.g., Post a job now) the user to input a minimal amount of position-related data into a set of input fields or boxes of a digital, e.g., online, form, including a job title field 102, a company name field 104, a workplace type field 106, a job location field 108, and a job type field 110. In some implementations, not all of the fields 102, 104, 106, 108, 110 are required for the automated description generation. For example, the disclosed technologies can auto-generate a job description even if only the job title field receives input. This is because, as explained in more detail below, the disclosed technologies can leverage a user connection network to automatically generate inferred data to supplement the data received via user interface 100.

Examples of job titles include generalized job categories such as software engineer or sales associate and specific job roles such as Java architect or commercial real estate sales associate. Examples of company names include names of companies for which the user is responsible for managing job postings, which can include the name of the company by which the user is employed or the name of another company for which the user is a placement service or a hired recruiter, for example. Examples of workplace types include remote, on-site, and hybrid, and can indicate the extent to which the person hired for the job is expected to work in an office or at home. Examples of job locations include geographic locations such as cites, states, countries, or towns. Examples of job types include full-time and part-time, e.g., a job type indicates the number of hours per week the person hired for the job is expected to work.

The position-related data received via user interface 100 are considered structured data. Structured data as used herein may refer to data that conforms to a pre-defined data type, specification, or format. For instance, job title is structured data that includes a string value having a maximum length of N characters, where N is a positive integer, e.g., an integer less than 50. In contrast to structured data, unstructured data as used herein may refer to data that does not conform to a pre-defined data type, specification, or format. For instance, a sentence, phrase, or paragraph of a document includes unstructured data.

The position-related data received via user interface 100 are alternatively or additionally considered explicit data. Explicit data as used herein may refer to data that is explicitly associated or linked with a specific entity, data type, or label. For example, the JobTitle1 data value input into the Job Title field is explicit data because it is explicitly associated with the Job Title data type or label. Similarly, the CompanyName1 data value input into the Company field is explicit data because it is explicitly associated with the Company data type or label.

In contrast to explicit data, inferred data as used here may refer to data that is not initially explicitly associated or linked with a specific entity, data type, or label; in other words, a relationship between the data and a specific entity, data type, or label is inferred rather than explicit. For example, as described in more detail below, an inferred data generator can generate inferred data such as skill keywords, which are not explicitly linked with a particular job title but such a link can be inferred based on, for example, statistical correlations or machine learning model output.

The position-related data received via user interface 100 are alternatively or additionally considered standardized data. Standardized data as used herein may refer to data that has been validated as a result of, for example, matching the data to a canonical piece of data. Matching as used herein may refer to a direct matching (e.g., two data values are identical) or a fuzzy or approximate matching, e.g., a matching that is based on a comparison of a measure of a textual similarity or semantic similarity between two pieces of data to a similarity criterion or threshold, where the value of the similarity criterion or threshold is determined based on the requirements of a particular design or implementation of the system.

After the user inputs text into the Job Title field, the job posting system validates the inputted text by checking to see whether the inputted text matches a canonical value of a job title, where the canonical value is stored in and can be retrieved from, for example, a set of valid job titles such as a taxonomy or an ontology, where the set of valid job titles, taxonomy or ontology can be updated dynamically e.g., as new job postings are added to the job posting system or new user profiles are added to the user connection network.

For instance, if the user inputs software programmer into the Job Title field and the job posting system determines that software programmer is not a valid job title based on a search of a taxonomy or ontology, the job posting system requests the user to select a canonical job title that most closely matches software programmer, e.g., software engineer. The inputs received by the user interface 100 for the Company, Workplace type, Job location, and Job type fields are validated in a similar manner in that the inputs are required to match respective canonical values in order to be accepted by the job posting system. For example, the set of valid workplace types could include only three canonical values: remote, on-site, and hybrid, while the set of valid job types could include two canonical values: full-time and part-time.

In some implementations, the Company field 104 is pre-filled with the name of the user's company, i.e., the company by which the user is employed. The name of the user's company is obtained from the user's stored profile data, which can be extracted from the user connection network, in some implementations.

In some implementations, the graphical user interface (GUI) control element 112 (Start free job post) is not selectable by the user until all of the data input into the fields 102, 104, 106, 108, 110 are successfully validated. If a selection of the GUI control element 112 is received via the user interface 100 and all of the required inputs have been validated, the job posting system can proceed to, for example, FIG. 2, FIG. 3, or FIG. 4, described below. That is, the minimal amount of structured data received via user interface 100 is sufficient for the job posting system to auto-generate a complete job description based on the job title provided, using a generative language model, as described in more detail below. The determination of which pieces of data are required for the automated description generation is configurable according to the requirements of a particular design or implementation of the computing system 800. For example, in some implementation, only the job title is required; in other implementations, both the job title and company name are required; in still other implementations, all of the fields shown in FIG. 1 are required to be filled before a job description can be auto-generated.

GUI control element 114 (Manage Job Posts) and GUI control element 116 are user-selectable. For example, if a selection is received via GUI control element 114, a Manage Job Posts page is loaded into the user's display, thereby enabling the user to view or edit any previously-created job posts. If a selection is received via GUI control element 116, the user's profile page is loaded into the user's display, thereby enabling the user to view their own profile page to, for example, research or recall information needed for the new job post.

The examples shown in FIG. 1 and the accompanying description, above are provided for illustration purposes. This disclosure is not limited to the described examples.

Figure 2:
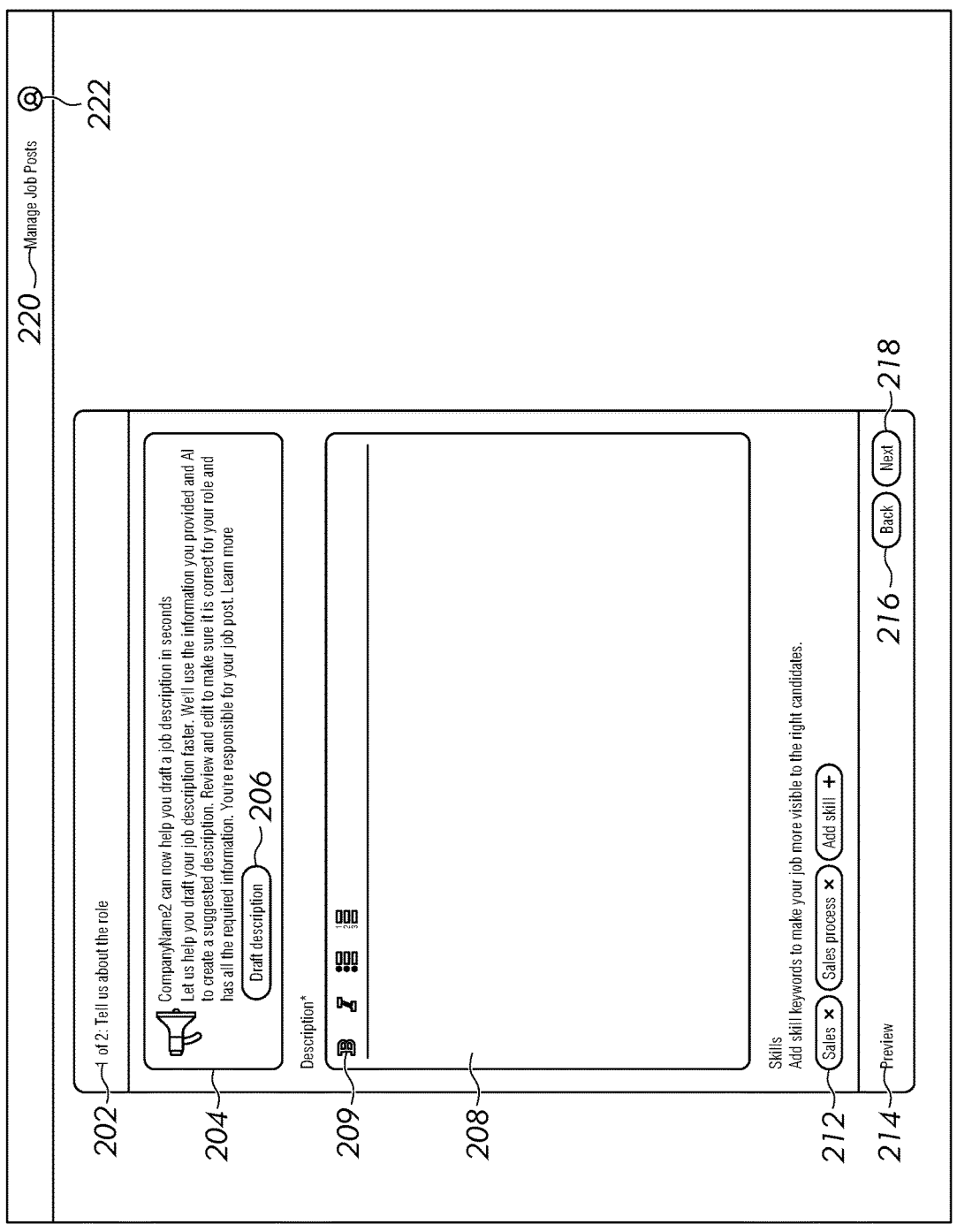
FIG. 2 illustrates an example of a screen capture of a user interface to create a digital job posting in accordance with some embodiments of the present disclosure.

FIG. 2 illustrates an example an example of a screen capture of a user interface to create a digital job posting in accordance with some embodiments of the present disclosure.

The user interface 200 of FIG. 2 is presented by an application software system, such as a job posting system, to a user who wants to create a digital job posting. In some implementations, the user interface 200 is implemented as a web page that is stored, e.g., at a server or in a cache of a user device, and then loaded into a display of a user device via the user device sending a page load request to the server. The user interface 200 includes a request element 202 for the user to input information about the a role that that job posting is intended to fill. The user interface 200 also includes a request element 204 for the user to initiate an automated process by which the job posting system uses a generative language model to auto-generate a job description in place of the user manually creating the job description. The request element 204 includes a graphical user interface (GUI) control element 206 (Draft description).

If a selection is received via the GUI control element 206, the job posting system initiates an automated description generation process that invokes a generative language model to auto-generate a job description, as described in more detail below. For example, a user interface screen progression could include user interface 100 and user interface 200, such that in response to a selection of GUI control element 206, the job posting system formulates a prompt for a generative language model based on the structured position-related data received via user interface 100 and inputs the prompt to the generative language model. In response to the prompt, the generative language model outputs a job description as shown, for example, in FIG. 4, described below.

The user interface 200 includes a text input box 208 and a set of text editing tools 209, such that the user can compose a job description by hand (or paste a pre-existing job description) into text input box 208 and perform editing functions on the user-generated job description within the text input box 208, as an alternative to selecting the GUI control element 206 (automated Draft description button).

The user interface 200 displays a set of user-selectable suggested skill keywords 212. In some implementations, the set of user-selectable suggested skill keywords 212 is determined based on statistics, machine learning-based classification models, or extracted from an entity graph, as described in more detail below. For example, statistics are computed across a job posting system based on the frequency of occurrence of particular combinations of skill keyword-job title combinations in previously-created job postings, and the skill keywords that most frequently occur in combination with the job title received at field 102 of FIG. 1 are included in the set of user-selectable suggested skill keywords 212.

In another example, a binary classifier is trained on ground truth combinations of skill keywords and job titles that have been created by machine learning engineers or extracted from the job posting system. The job title received at field 102 of FIG. 1 is input to the trained binary classifier, and the binary classifier outputs the set of suggested skill keywords 212 based on the job title. In a further example, an entity graph is used to model relationships between job titles and skill keywords, where job titles and skill keywords are represented as nodes in the entity graph and relationships between job titles and skill keywords are represented by edges between the nodes in the entity graph, such that, for example, the entity graph can be searched or traversed for a node that represents the job title received at field 102 of FIG. 1, and then the related skill keywords can be identified based on edges connecting the skill keywords to the job title in the entity graph.

If a selection of a user-selectable skill keyword 212 is received via user interface 200, the selected skill keyword(s) are added to the job description. In some implementations, selected skill keyword(s) 212 are included in the prompt that is input to the generative language model, and the generative language model outputs a machine-generated job description based on the selected skill keyword(s) 212.

The user interface 200 includes a GUI control element 214 (Preview). A selection of the GUI control element 214 generates and loads a preview of the job posting based on the inputs that have been received via user interface 200 and/or user interface 100. The user interface 200 includes navigation GUI control elements 216 (Back) and 218 (Next). The GUI control element 216 if selected re-loads the user interface 100 such that the user can revise the structured-data inputs for any of the fields of the user interface 100. The GUI control element 218 if selected loads another user interface that advances the process of generating a job posting, such as user interface 300, user interface 400, or another user interface (not shown).

The examples shown in FIG. 2 and the accompanying description, above are provided for illustration purposes. This disclosure is not limited to the described examples.

Figure 3:
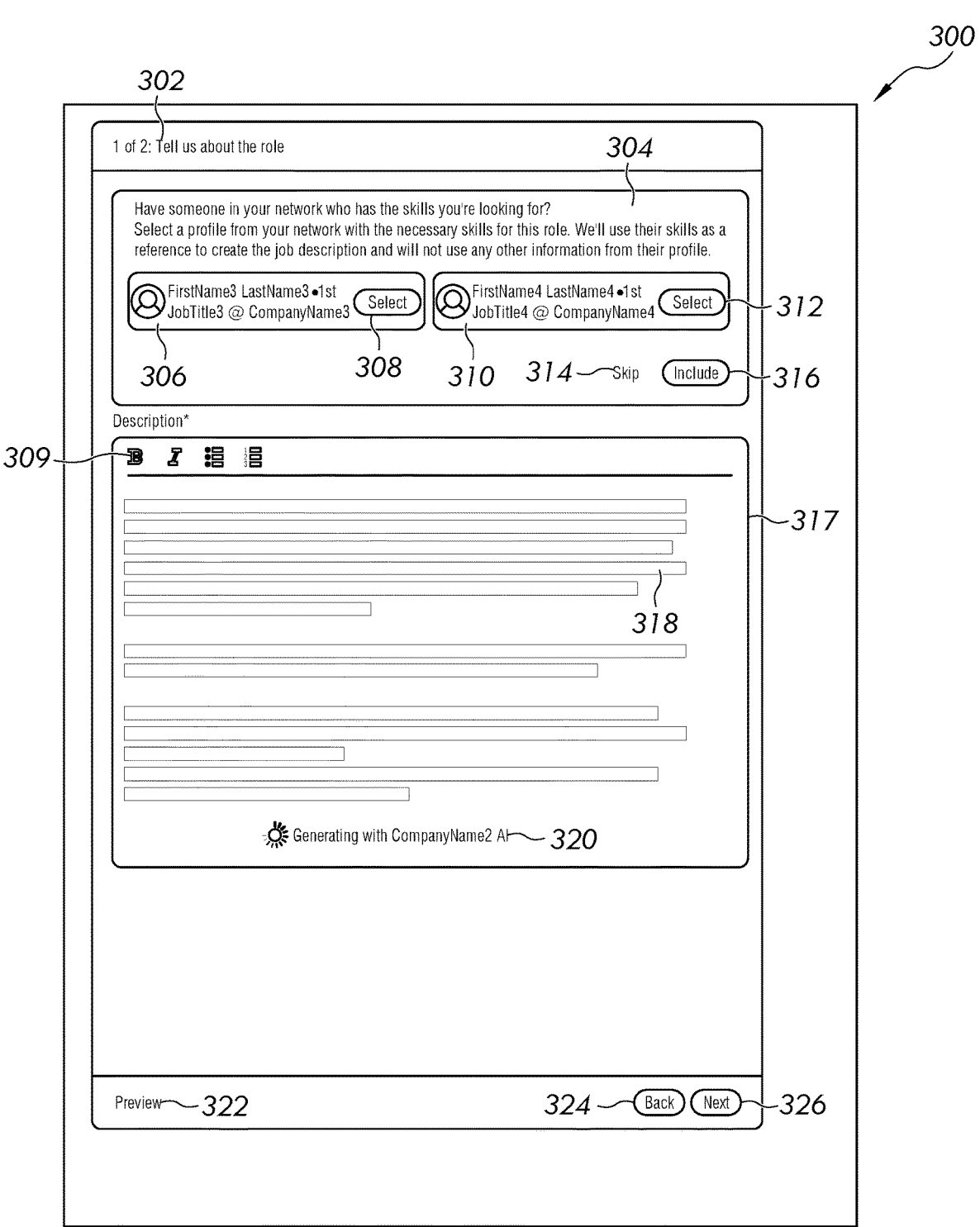
FIG. 3 illustrates an example of a screen capture of a user interface to create a digital job posting in accordance with some embodiments of the present disclosure.

FIG. 3 illustrates an example an example of a screen capture of a user interface to create a digital job posting in accordance with some embodiments of the present disclosure.

The user interface 300 of FIG. 3 is presented by an application software system, such as a job posting system, to a user who wants to create a digital job posting. In some implementations, the user interface 300 is implemented as a web page that is stored, e.g., at a server or in a cache of a user device, and then loaded into a display of a user device via the user device sending a page load request to the server. In some implementations, the user interface 300 is included in a screen progression or flow that includes user interface 100 followed by user interface 200 followed by user interface 300. The user interface 300 includes a request element 302 for the user to input information about a role that the job posting is intended to fill. The user interface 300 also includes a request element 304 for the user to select another user from a set of suggested users 306, 310 who has a skill set that can be used by an automated process to auto-generate a job description. The request element 304 includes graphical user interface (GUI) control elements 308, 310 by which the user can select the suggested user 306 or the suggested user 310.

In the example of FIG. 3, the set of suggested users includes a suggested user 306 (Firstname3, Lastname3) and a suggested user 310 (Firstname4, Lastname4). The set of suggested users is generated by the job posting system by, for example, searching a user connection network, or a connection graph associated with the user connection network, for user profiles that match at least some of the position-related data, e.g., the job title specified in field 102 of user interface 100. The job posting system can alternatively or in addition use any combination of other structured keywords (e.g., company, location, etc.) to find similar users in the user network, e.g., users who have a similar or matching company, a similar or matching location, both a similar or matching company and a similar or matching location, etc.

The connection graph includes, e.g., nth-degree Connections of the user creating the job posting, where n is a positive integer, e.g., n=1 or n=2. The user creating the job posting can opt not to select any of the suggested users 306, 310 by selecting a GUI control element 314 (Skip). The user creating the job posting can select a suggested user by selecting GUI control element 308 (Select) or GUI control element 312 (Select) and then selecting GUI control element 316 (Include).

In response to a selection of GUI control element 308 or GUI control element 312, and a selection of GUI control element 316, the job posting system incorporates skill keywords, which are extracted from the user connection network that contains the user profile of the selected suggested user (e.g., user 306 or user 310), into the prompt for the generative language model and inputs the prompt into the generative language model to cause the generative language model to output a job description that the generative language model has machine-generated based on the skill keywords extracted from the user profile of the selected suggested user in the user connection network.

The user interface 300 displays GUI elements 318, 320 within a window 317 to inform the user working on the job posting that the auto-generated job description is in progress and will be displayed in the window 317. The user interface 300 also includes editing tools 309 to enable the user to edit the auto-generated job description once it is completed and displayed in the window 317.

The user interface 300 includes a GUI control element 322 (Preview). A selection of the GUI control element 322 generates and loads a preview of the job posting based on the inputs that have been received via user interface 300, user interface 200 and/or user interface 100. The user interface 300 includes navigation GUI control elements 324 (Back) and 326 (Next). The GUI control element 324 if selected re-loads the user interface 100 or the user interface 200 such that the user can revise the previously-provided inputs. The GUI control element 326 if selected loads another user interface that advances the process of generating a job posting, such as user interface 400 or another user interface (not shown).

The examples shown in FIG. 3 and the accompanying description, above are provided for illustration purposes. This disclosure is not limited to the described examples.

Figure 4:
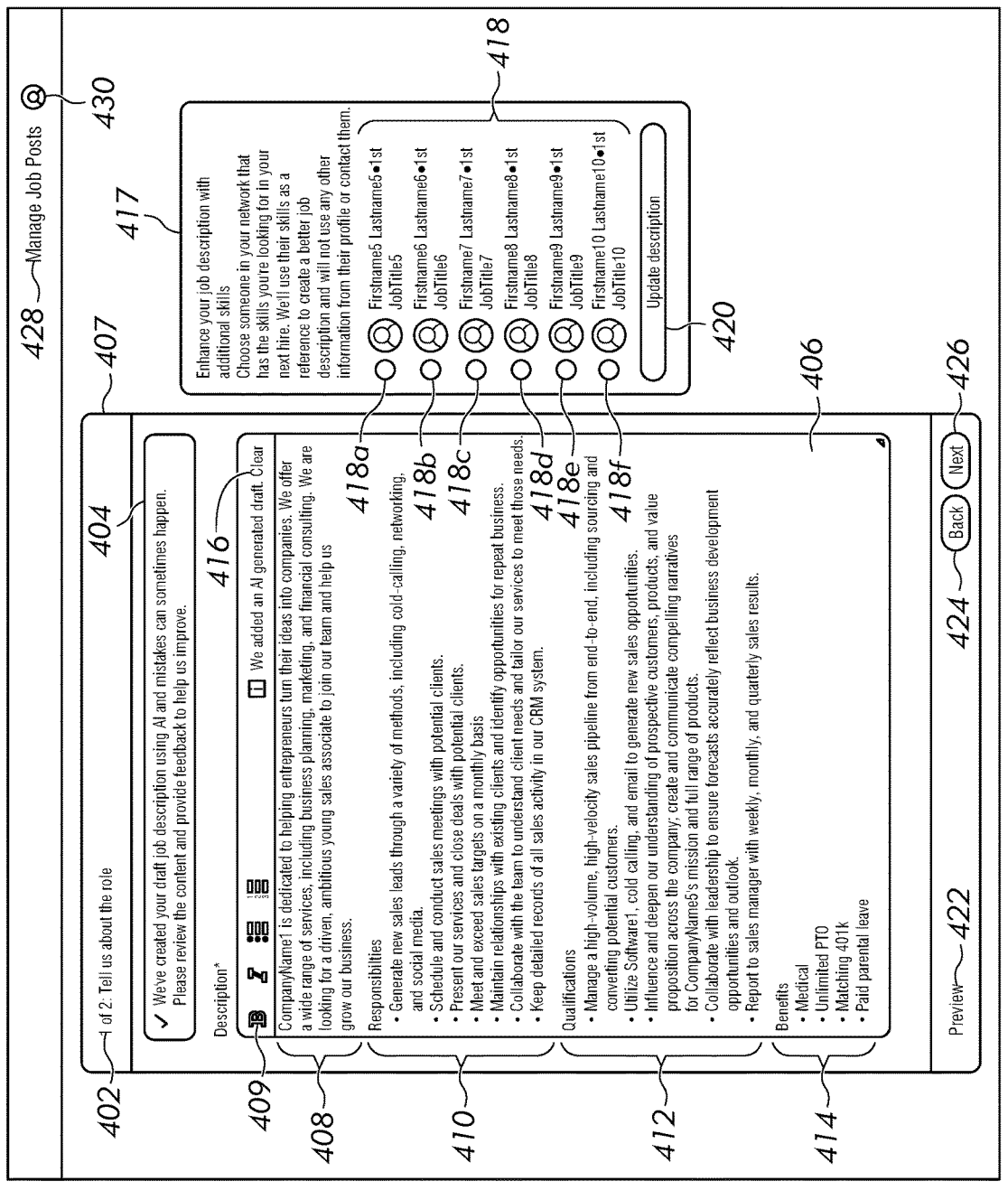
FIG. 4 illustrates an example of a screen capture of a user interface to create a digital job posting in accordance with some embodiments of the present disclosure.

FIG. 4 illustrates an example an example of a screen capture of a user interface to create an online job posting in accordance with some embodiments of the present disclosure.

The user interface 400 of FIG. 4 is presented by an application software system, such as a job posting system, to a user who wants to create an online job posting. In some implementations, the user interface 400 is implemented as a web page that is stored, e.g., at a server or in a cache of a user device, and then loaded into a display of a user device via the user device sending a page load request to the server. The user interface 400 includes request elements 402, 404 for the user to input information about a role that that job posting is intended to fill. In the case of user interface 400, the job posting system has auto-generated a job description using a generative language model and displayed the auto-generated job description in window 406. The request elements 402, 404 are selectable to request the user to review and edit the auto-generated description displayed in the window 406.

In some implementations, the job posting system uses one or more features of a previously-generated job description to generate a subsequent job description. For example, each time the job posting system auto-generates a job description that is user-reviewed, approved and distributed to a user network, e.g., as part of a job posting, the auto-generated job description is stored in a data store of, e.g., computing system 800. In this example, the job posting system incorporates input provided by a job poster via, e.g., a graphical user interface, into a query and uses the query to search the data store for a previously auto-generated description that matches or is similar to the query. If a previously-generated description is found that matches or is similar to the user's input, one or more keywords are extracted from the previously-created posting and incorporated into the subsequent job description.

Additionally, we can also identify similar structure keywords that are hand-input by the poster, such as job title and job location, use those keywords to identify a previous job posting description that matches those keywords, and pull those terms.

The user interface 400 also includes a user-selectable graphical user interface (GUI) control element 416 (Clear) that if selected clears or deletes the auto-generated description from the window 406 and allows the user to create the job description by hand in the window 406, instead of accepting or editing the auto-generated description. The user interface 400 also includes a set of editing tools 409 by which the user can edit the auto-generated description in the window below.

The user interface 400 displays the auto-generated job description output by the generative language model in the text window 406. The auto-generated job description includes a number of segments arranged in a logical order, where the logical order is based on instructions and/or examples that are included in the prompt, which is configured for the generative language model and used as input to the generative language model. In the example of FIG. 4, the auto-generated description includes a company description 408, a description of job responsibilities 410, a description of job qualifications 412, and a description of benefits 414, where the company description 408 is followed by the description of job responsibilities, the description of job responsibilities is followed by the description of job qualifications 412, and the description of job qualifications 412 is followed by the description of benefits 414. Each segment of the auto-generated job description has a structure (e.g., paragraph or bullet points) and a tone (e.g., professional, persuasive), which are based on instructions and/or examples that are included in the prompt that is used as input to the generative language model. Any or all of the portions of the machine-generated job description shown in the window 406, as well as the format, arrangement, and tone, can be customized for a particular job posting, company, or job poster, based on, for example, explicit input provided by the job poster, inferred input generated by the description generation system, and/or instructions/examples contained in the prompt template.

In the example of FIG. 4, a window 417 includes a GUI element 418, which allows the user to further modify or enhance the initial version of the auto-generated job description displayed in the window 406, with one or more additional skill keywords extracted that can be from user profiles of users within the posting user's connection network in a similar manner as described above with reference to element 304. Element 418 includes user-selectable GUI control elements 418a, 418b, 418c, 418d, 418e, 418f (e.g., radio buttons), which are each associated with a respective suggested user from the posting user's connection network. Element 418 enables the posting user to select one of the suggested users by selecting a control element 418a, 418b, 418c, 418d, 418e, 418f. By selecting the GUI control element 420 (Update description), one or more skill keywords from the selected suggested user's profile are automatically incorporated into a subsequent version of the prompt, and the subsequent version of the prompt is input to the generative language model, and the generative language model outputs a subsequent version of the auto-generated job description based on the subsequent version of the prompt. For example, additional skill keywords are extracted from the user profile of the selected suggested user on the user connection network and added to the prompt configured for the generative language model, the modified or supplemented prompt is input to the generative language model, and the generative language model outputs a subsequent version of the auto-generated job description based on the additional skill keywords extracted from the user profile of the selected suggested user via the user connection network.

The user interface 400 includes a GUI control element 422 (Preview). A selection of the GUI control element 422 generates and loads a preview of the job posting based on the inputs that have been received via user interface 400, user interface 300, user interface 200 and/or user interface 100. The user interface 400 includes navigation GUI control elements 424 (Back) and 426 (Next). The GUI control element 424 if selected re-loads the user interface 300, the user interface 200, or the user interface 100, such that the user can revise the previously-provided inputs. The GUI control element 426 if selected loads another user interface that advances the process of generating a job posting (not shown).

The examples shown in FIG. 4 and the accompanying description, above are provided for illustration purposes. This disclosure is not limited to the described examples.

Figure 5:
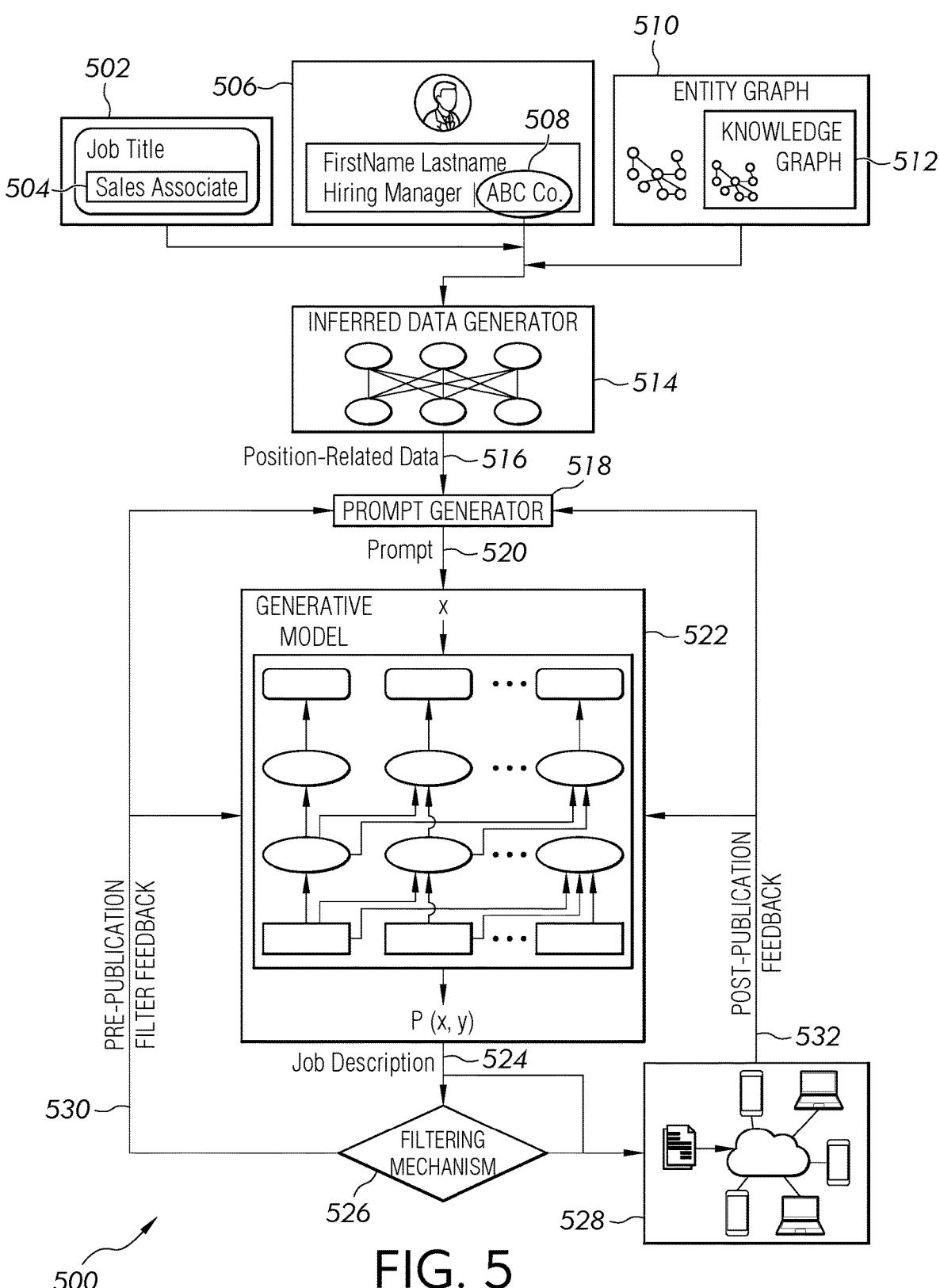
FIG. 5 is a flow diagram of an example method for automated description generation using components of a description generation system in accordance with some embodiments of the present disclosure.

FIG. 5 is a flow diagram of an example method for automated description generation using components of a description generation system in accordance with some embodiments of the present disclosure. In the example of FIG. 5, a description generation system 500 includes an inferred data generator 514, a prompt generator 518, a generative model 522, a filtering mechanism 526, and a description distribution system 528. In some implementations, one or more portions of description generation system 500 are implemented on a server computer capable of establishing an electronic communication connection with a client device, such as a mobile computing device, a wearable computing device, a laptop computer, or a desktop computer, directly or via a network. In other implementations, one or more portions of description generation system 500 are implemented on a client device (e.g., without the need to communicate with a network or a server computer). For instance, one or more portions of the described machine learning architecture and/or the generative language model are implemented on the client device, in some implementations.

The inferred data generator 514 generates inferred position-related data based on data obtained from a set of data sources. The set of data sources from which inferred position-related data is derived includes, for instance, an online form 502 of a job posting system, a user profile 506 of a user connection network, and an entity graph 510 associated with the user connection network. In some implementations, a database of previous job postings is a data source in addition to or as an alternative to other types of data sources. For example, one or more databases store previously-generated job postings, e.g., job postings that have been previously auto-generated for the same company, the same job title, the same location, etc., such that data used by inferred data generator 514 to generate inferred position-related data can be obtained readily from the one or more databases that store pre-existing posts.

Based on the data obtained from the data sources 502, 506, 510, the inferred data generator 514 generates and outputs position-related data 516. Position-related data 516 includes a combination of explicit position-related data (e.g., a job title received at field 504 of online form 502) and inferred position-related data (e.g., a company description associated with the company name received from user profile 506 and/or one or more skill keywords received from entity graph 510).

In some implementations, the inferred data generator 514 applies different weight values to different portions of the inferred position-related data and/or the explicit position-related data. The different weight values for the different portions of inferred position-related data and/or explicit position-related data are used, for example, by the prompt generator to formulate the prompt and/or by the generative language model to auto-generate and output the job description. For example, a lower weight value can be assigned to the explicit data and a higher value assigned to the inferred data if the explicit data is incomplete (e.g., the job posting user left a field blank or only partially filled in) such that the prompt generator and/or generative language model assigns a higher priority to the inferred data than the explicit data when generating the prompt or job description, as the case may be. As another example, a lower weight value can be assigned to the explicit data and a higher value to the inferred data if the job posting user is using the jobs system for the first time, whereas a higher weight value can be assigned to explicit data if the job poster is an experienced user. As another example, different weight values can be assigned to different portions of the inferred position-related data. For instance if a confidence value associated with a portion of the inferred data does not satisfy a confidence threshold, that portion of the inferred data is assigned a lower weight value while another portion of the inferred position-related data that satisfies the confidence threshold is assigned a higher weight value.

The inferred data generator 514 interfaces with one or more application software systems implementing the online form for creating a job posting (e.g., a job posting system), the user profile (e.g., a user connection network, such as a professional social network service), and a connection graph associated with the user connection network. In the example of FIG. 5, an online form 502 of a job posting system receives, from the user creating the job posting, a data value received via field 504 (Sales Associate) into a Job Title field, and the job posting system sends the data value received via field 504 to inferred data generator 514. The data value received via field 504 is considered explicit position-related data, in some implementations.

An entity profile 506 (e.g., a user profile) of the user connection network contains profile data associated with an entity involved in creating the job posting (e.g., the posting user), including a position-related data value 508. The position-related data value 508 can be considered inferred data that implicitly relates to the job posting being created because it contains data that is not explicitly input via the online form 502 of the job posting system but rather contains data that is stored in connection with an entity profile in the user connection network. For example, the entity profile 506 contains the name of a company on behalf of which the posting user is creating the job posting (e.g., the posting user's current employer).

Alternatively or in addition, the position-related data value 508 is used to obtain another position-related data value that is not obtained from either the online form 502 or the user profile 506. For example, the company name data value 508 is used to search the user connection network for posts that discuss the company associated with that company name, such as articles, press releases, etc. The results of the company name search are curated (using, e.g., the generative language model) to auto-generate a company description for the company associated with the company name. In this case, the company description is considered inferred data generated by inferred data generator 514 querying the entity graph 510 for content items that mention the company name, formulating a prompt for the generative language model based on the query results, e.g., a prompt that instructs the generative model to create a summary of the query results, receiving output of the generative language model and using the output of the generative language model into a company description.

The inferred data generator 514 extracts the position-related data value 508 from the user connection network or more specifically from an entity profile of the user connection network that is associated with the user creating the job posting. The inferred data generator 514 identifies the entity profile 506 as being associated with the posting user by, for example, mapping an identifier associated with the posting user's login session at the job posting system with an identifier associated with the entity profile 506 in the user connection network.

Figure 6:
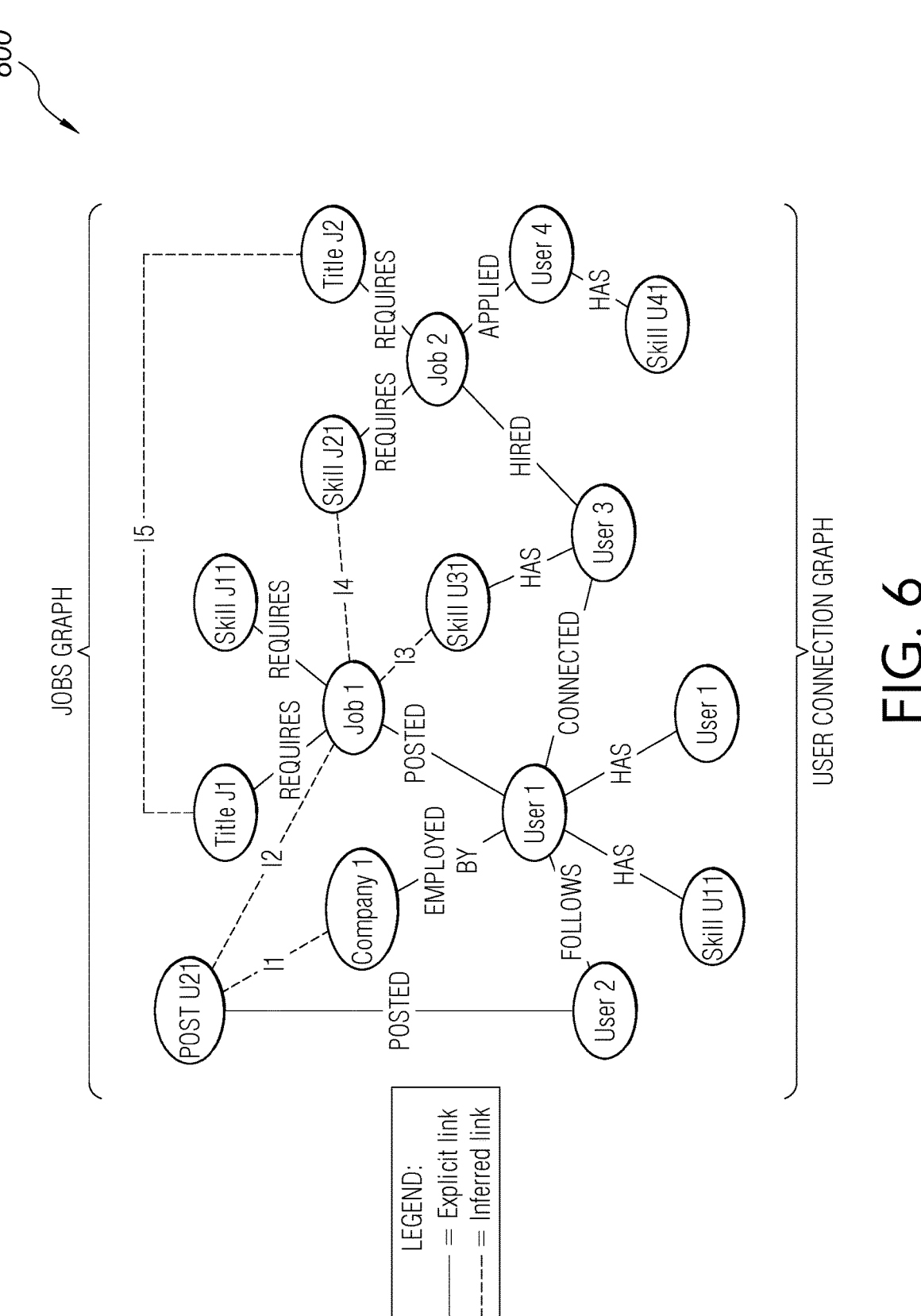
FIG. 6 is an example of an entity graph in accordance with some embodiments of the present disclosure.

The inferred data generator 514 extracts position-related data from an entity graph 510. The entity graph 510 includes entity profile data arranged according to a connection graph, e.g., a graph of connections and relationships between users of the user connection network. For example, the entity graph 510 represents entities as nodes and relationships between entities as edges between the nodes. The entity graph 510 includes a cross-application knowledge graph 512. The cross-application knowledge graph 512 is a subset or a superset of the entity graph 510 (e.g., a combination of multiple entity graphs) that links data from the user connection network with data from other application software systems, such as the job posting system. An example of an entity graph or cross-application knowledge graph is shown in FIG. 6, described below.

Entity as used herein may refer to a user of an online system or another type of entity, such as a company or an organization, or a job posting. For example, in a user connection network, an entity can include or reference a web page with which a user of the user connection network can interact. In some implementations of the entity graph 510, an activity can be represented as an entity. Activity as used herein may refer to network activity, such as digital communications between computing devices and systems. Examples of network activity include initiating a session with an application software system by, e.g., logging in to an application, initiating a page load to load a web page into a browser, uploading, downloading, creating, and sharing digital content items on the network, and executing social actions, such as sending messages, adding comments, and/or inputting social reactions to articles or posts on the network.

The inferred data generator 514 extracts data from the user connection network by, for example, traversing the entity graph 510 or knowledge graph 512, e.g., by executing one or more queries on one or more data stores of the user connection network that store data associated with the nodes and edges of the entity graph 510 or knowledge graph 512.

Figure 7:
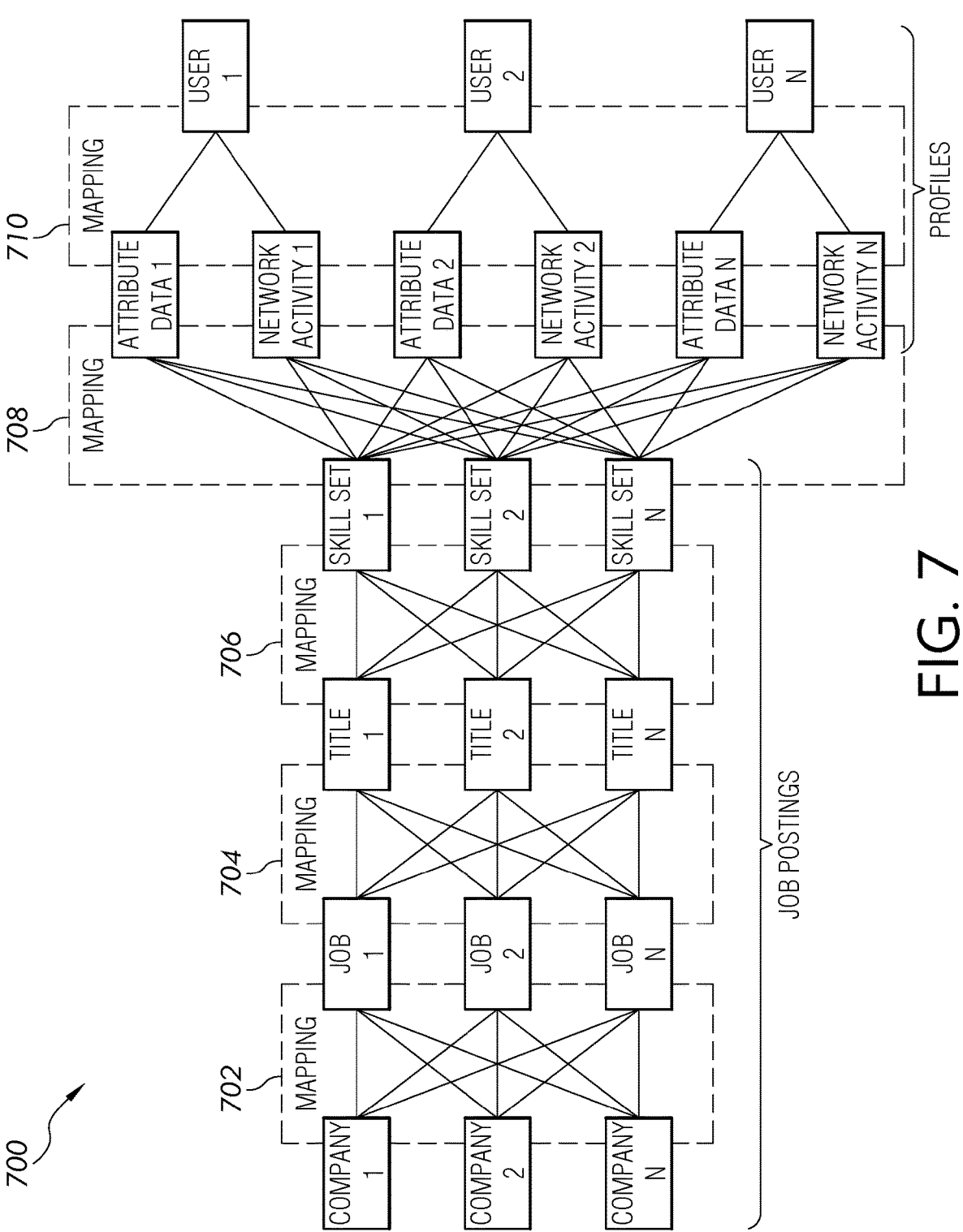
FIG. 7 is a graphical representation of examples of mappings that can be used to generate inferred data in accordance with some embodiments of the present disclosure.

Using the data extracted from the online form 502, the entity profile 506, and the entity graph 510, the inferred data generator 514 generates inferred position-related data. In some implementations, the inferred data generator 514 generates the inferred position-related data by computing statistics and determining statistical correlations between extracted data values. In one approach, inferred data generator 514 computes statistics such as the frequency of occurrence of specific skill keywords in user profiles of users that have been hired for job postings that contain specific job titles, and uses those statistics to determine correlations between skill keywords and job titles. Statistical correlations between data values can be represented as mappings. Examples of mappings are shown in FIG. 7, described below.

In another approach, inferred data generator 514 inputs pairs of extracted position-related data into a trained machine learning-based classifier and uses the output of the trained machine learning-based classifier to determine a strength of relationship between the pieces of position-related data in the pair. For example, a machine learning-based classifier is trained on ground-truth examples of skill keyword-job title pairs using supervised machine learning applied to a machine learning algorithm such as logistic regression or linear regression. Inferred data generator 514 uses the trained machine learning-based classifier (e.g., a binary classifier) to determine a strength of relationship between particular skill keywords and particular job titles. The strength of relationship between the data values is indicated by a score or label output by the machine learning-based classifier. For example, for a given skill keyword-job title pair input to the machine learning-based classifier, if the output of the machine learning-based classifier is 0, the inferred data generator 514 determines that there is no relationship between the skill keyword and the job title, but if the output of the machine learning-based classifier is 1, the inferred data generator 514 determines that there is a relationship between the skill keyword and the job title. Machine learning classifier-determined relationships between data values can be represented as mappings. Examples of mappings are shown in FIG. 7, described below.

In another approach, inferred data generator 514 applies a graph neural network to entity graph 510 or knowledge graph 512 to infer relationships between different pieces of position-related data. For example, a modified version of a Bidirectional Encoder Representation with Transformers (BERT) neural network is specifically configured for entity inference, e.g., to infer relationships between entities that are not explicitly linked in the entity graph. For instance, given a particular job title (e.g., a job title input via online form 502), the modified BERT is used to infer skill keywords that are not explicitly linked with that particular job title in the entity graph 510. The modified BERT is trained with self-supervision, e.g., by masking some portions of entity profile data so that the BERT learns to predict the masked data. During scoring/inference, a masked entity is associated with entity profile data and the model outputs a skill keyword at the position of the masked entity based on the entity profile data. Graph neural network-based determinations of relationships between data values can be represented as mappings. Examples of mappings are shown in FIG. 7, described below.

The resulting output of inferred data generator 514, e.g., position-related data 516, includes explicit position-related data and inferred position-related data, such as a job title (explicit data) and a set of skill keywords (inferred data). In some implementations, the position-related data 516 also or alternatively includes a company name and/or company description. An example of an inferred data generation subsystem that can be used to implement inferred generator 514 is described in more detail below with reference to FIG. 10.

The prompt generator 518 formulates a prompt 520 based on the position-related data 516 generated and output by the inferred data generator 514. The prompt 520 is configured for input to generative model 522. The prompt generator 518 formulates the prompt 520 by applying a prompt template to the position related data 516. For example, the prompt generator 518 maps portions of the position-related data 516 to respective placeholders (e.g., parameters) contained in the prompt template. An example of a structure of a prompt is shown in FIG. 12, described below. A specific example of a prompt configured to cause a generative language model to output a job description is provided in Table 1, shown and described below. An example of a prompt generation subsystem that can be used to implement prompt generator 518 is described in more detail below with reference to FIG. 11.

The prompt 520 output by the prompt generator 518 is sent to generative model 522. In some implementations, sending the prompt to the generative language model 522 includes incorporating the prompt 520 into an API (application programming interface) call using an API specified by the generative model 522. The generative model 522 includes a generative language model that is configured using artificial intelligence-based technologies to machine-generate natural language text. In some embodiments, generative model 522 also or alternatively includes one or more generative models that are configured to machine-generate other forms of digital content, such as images, audio, video, etc. Thus, while the term generative language model can be used to refer to generative models that machine-generate text, as used herein, a generative language model can include one or more components that generate non-text output or a combination of text and non-text output.

In some implementations, the generative model 522 is constructed using a neural network-based machine learning model architecture. In some implementations, the neural network-based architecture includes one or more input layers that receive task descriptions (or prompts), generate one or more embeddings based on the task descriptions, and pass the one or more embeddings to one or more other layers of the neural network. In other implementations, the one or more embedding are generated based on the task description by a pre-processor, the embeddings are input to the generative language model, and the generative language model outputs digital content, e.g., natural language text or a combination of natural language text and non-text output, based on the embeddings.

In some implementations, the neural network-based machine learning model architecture includes one or more self-attention layers that allow the model to assign different weights to different words or phrases included in the model input. Alternatively or in addition, the neural network architecture includes feed-forward layers and residual connections that allow the model to machine-learn complex data patterns including relationships between different words or phrases in multiple different contexts. In some implementations, the generative model 522 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the description generation system 500.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models that significantly advance the state-of-the-art in various linguistic tasks such as machine translation, sentiment analysis, question answering and sentence similarity. In some examples, the neural network-based machine learning model architecture includes or is based on one or more predictive text neural models that can receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architecture includes or is based on one or more multimodal neural networks capable of outputting different modalities (e.g., text, image, sound, etc.) separately and/or in combination based on textual input. Accordingly, in some examples, a multimodal neural network of the description generation system is capable of outputting digital content that includes a combination of two or more of text, images, video or sound.

The generative model 522 is trained on a large dataset of natural language text. For example, training samples of natural language text extracted from publicly available data sources are used to train the generative model 522. The size and composition of the dataset used to train the generative model 522 can vary according to the requirements of a particular design or implementation of the description generation system 500. In some implementations, the dataset used to train the generative model 522 includes hundreds of thousands to millions or more different natural language text training samples. In some embodiments, generative model 522 includes multiple generative language models trained on differently sized datasets. For example, generative model 522 can include a comprehensive but low capacity model that is trained on a large data set and used for generating examples, and the same generative language model also can include a less comprehensive but high capacity model that is trained on a smaller data set, where the high capacity model is used to generate outputs based on examples obtained from the low capacity model. In some implementations, reinforcement learning is used to further improve the output of the generative model 522. In reinforcement learning, ground-truth examples of desired model output are paired with respective prompts, and these prompt-output pairs are used to train or fine tune the generative model 522.

At the generative model 522, one or more model inputs, x, are formulated based on the position-related data 516. For example, the generative model 522 maps the prompt 520 to a model input x. For each prompt, e.g., x, the generative model 522 produces one or more outputs y and, for each output y, a score P(x, y) that indicates a likelihood of the prompt x and the respective output y occurring together. Using the output(s) y and corresponding score(s) P (x, y), the generative model 522 generates a job description 524. The job description 524 includes at least one piece of writing that has been machine-generated by the generative model 522. Implementations of the disclosed prompt and description generation technologies are described in more detail below, for example with reference to FIG. 9, FIG. 10, FIG. 11, FIG. 12, and FIG. 13.

Output of the generative model 522 includes job description 524. In some implementations, outputting the job description 524 includes receiving the job description 524 from the generative language model 522 via an API call using an API specified by the generative model 522. In the example of FIG. 5, the job description 524 output by the generative model 522 can be forwarded directly to the description distribution system 528 for distribution to a user network, in some cases. For example, previously-performed prompt refinements and/or model fine tuning performed by one or more pre-publication and/or post-publication feedback mechanisms on descriptions previously output by the generative language model can improve the quality of the generative language model output to the extent that no pre-publication review or filtering of the job description 524 is needed, such that the description 524 produced by the generative language model can be distributed directly by the description distribution system 528 without passing through the filtering mechanism 526.

Descriptions 524 that are not directly routed from the generative model 522 to the description distribution system 528 are sent to one or more filtering mechanisms 526. The functionality represented by the one or more filtering mechanisms 526 can be omitted from the description generation system 500 on any one or more iterations of the description generation system 500, in some implementations. For example, some filtering mechanisms 526 can be applied to certain job descriptions 524 but not to other job descriptions 524.

The filtering mechanism 526 applies one or more filters to the job description 524 if the job description 524 has not been sent directly to the description distribution subsystem 528. Examples of filters that can be applied to the job description 524 by filtering mechanism 526 include discriminative machine learning models that have been trained to label content items based on a probabilistic or statistical likelihood of the content items containing particular types of content (e.g., spam filters, inappropriate content filters, etc.) and discriminative models that have been trained to score content items based on a mathematical similarity to one or more particular scoring criteria (e.g., relevance filters, ranking models, etc.). Other examples of filters that can be applied to the job description 524 by filtering mechanism 526 include discriminative models that have been trained on feedback that has been previously received on output of the generative model 522. For example, a discriminative model is trained on generative model output-feedback pairs such as job description output by generative model 522 and corresponding rating values assigned to the job descriptions by human reviewers (e.g., the job posters). Once trained, the discriminative model can be used to automatically score newly generated job descriptions output by generative model 522 that haven't been rated by human reviewers. The discriminative model trained in this manner functions as a filter when a threshold rating value is specified, such that output of the generative language model that is assigned a rating by the discriminative model that falls below the threshold rating value is not distributed to the user network but rather is redirected to a feedback subsystem or another component of the description generation system.

In some implementations, generative models are configured to perform discriminative tasks. Thus, filtering mechanism 526 uses a generative model as an alternative to a discriminative model or in addition to a discriminative model, in some implementations. For example, by configuring a prompt with instructions to exclude certain words or phrases, a generative language model can be used to filter out, for instance, skill keywords that are unrelated or not relevant to particular job titles.

A classification model includes a machine learning model that has been trained to classify an input by assigning one or more labels to the input based on a statistical or probabilistic similarity of the input to previously-labeled data used to train the model. A classification model is created by applying a machine learning algorithm, such as linear regression or logistic regression, to a set of training data using, for example, a supervised machine learning technique. In supervised machine learning, the set of training data includes ground-truth labeled data samples. In some implementations, a classification model is created by applying a clustering algorithm to a set of training data that includes unlabeled data samples, using an unsupervised machine learning technique. An example of a classification model is a binary classifier that identifies inputs as either spam or not spam. Another example of a content classification model is a topic model that assigns an input to one topic or multiple topics based on similarities between the input and the unlabeled data used to train the model. In some implementations, a classification model is used to assign labels to generative language model-generated descriptions. For example, in description generation system 840, a classification model can be used to label generative language model-generated descriptions based on similarity to a particular relevant topic, skill set, company name, job title, or prompt, or to label descriptions based on similarity to a particular non-relevant topic such as spam or based on similarity to a relevant topic, such as a particular job title.

A content scoring model includes a machine learning model that is trained to generate a score for a pair of inputs, where the score statistically or probabilistically quantifies a relationship, association, strength of relationship, correlation, or affinity between the inputs in the pair. For example, a content scoring model can compute a score for a job title-skill keyword pair, and that score can be used to determine a skill keyword's relevance to a particular job title. A content scoring model includes, for example, a neural network model that is trained on training data that includes ground-truth sets of data pairs. Examples of content scoring models include ranking models that rank content items for distribution to a particular user or user group, such as for inclusion in a user or user group's news feed, where the ranking is based on training examples of the user's or user group's history of clicking or not clicking on similar content items in an online system such as application software system 830. Labels and scores output by machine learning models such as classification models and scoring models are received and processed by the filter mechanism, in some implementations. For example, the filter mechanism 526 filters out generative language model-generated job descriptions that have been assigned a label or score that satisfies the applicable filtering criteria so that the filtered job descriptions are not presented to the posting user or distributed via the user network.

Based on the output of the one or more filters, the filtering mechanism 526 forwards the job description 524 to a feedback mechanism or, in some cases, directly to description distribution system 528. Alternatively or in addition, the filtering mechanism 526 generates pre-publication filter feedback 530 based on the filter output, and returns the pre-publication filter feedback 530 to the generative model 522 and/or to the prompt generator 518 to be used to refine prompts and/or fine tune the generative model 522. The pre-publication filter feedback 530 is used to refine the prompt x, e.g., by modifying at least a portion of the prompt based on the pre-publication filter feedback 530. Alternatively or in addition, the pre-publication filter feedback 530 is used to fine tune the generative model 522, e.g., by modifying one or more parameters of the generative model 522 or by modifying the architecture of the generative model 522, based on the pre-publication filter feedback 530.

In some cases, the job description 524 is rejected based on the pre-publication filter feedback 530. If the job description 524 passes through filtering mechanism 526 without being returned to the generative model 522 and/or the prompt generator 518 to be used for prompt refinement or model training, the job description 524 can be incorporated into a job posting and distributed by the description distribution system 528 to a network, such as a user connection network of computing devices that are connected to an online system such as a social network service. Network as used herein may refer to a user connection network, such as a social network service or another type of application software system. In some implementations, the description generation system 529 uses a content serving system, such as content serving system 860, described below, to determine how to route job descriptions 524 through the network, e.g., to determine whether to place a particular job posting containing the job description 524 in a particular slot of a particular user's news feed during a particular login session.

After a job description 524 is distributed by the description distribution system 528, post-publication feedback 532 is generated as a result of distribution of job description 524 by description distribution system 528. For example, after a job description 524 is distributed to a network by description distribution system 528, one or more users of the network can generate network activity data that is linked with the job description 524. For instance, user-generated job applications and hiring decisions, as well as views, likes, comments, and social reactions on job postings containing job description 524 can be returned to generative model 522 and/or prompt generator 518 as post-publication feedback 532. The post-publication feedback 532 is used to refine the prompt x, e.g., by modifying at least a portion of the prompt to generate a subsequent job description based on the post-publication feedback 532. Alternatively or in addition, post-publication feedback 532 is used to fine tune the generative model 522, e.g., by modifying one or more parameters of the generative model 522 or by modifying the architecture of the generative model 522, based on the post-publication feedback 532.

The examples shown in FIG. 5 and the accompanying description, above are provided for illustration purposes.

This disclosure is not limited to the described examples. Additional or alternative details and implementations are described below.

FIG. 6 is an example of an entity graph 600 that can be used by an application software system, e.g., to support a user connection network, in accordance with some embodiments of the present disclosure, and to generate inferred data for a prompt for a generative language model. For instance, as shown in FIG. 6 and described below, inferred links can be created where no explicit links exist between nodes in the entity graph 600, and the inferred links can be used to identify relevant, but non-explicit, inputs to be included in a prompt for a generative language model to output a job description for a particular job.

An entity graph includes nodes, edges, and data (such as labels, weights, or scores) associated with nodes and/or edges. Nodes can be weighted based on, for example, edge counts or other types of computations, and edges can be weighted based on, for example, affinities or commonalities between the nodes connected by the edges, such as common attribute values (e.g., two users have the same job title or employer, or two users are n-degree Connections in a user connection network).

A graphing mechanism is used to create, update and maintain the entity graph. In some implementations, the graphing mechanism is a component of the database architecture used to implement the entity graph 600. For instance, the graphing mechanism can be a component of data storage system 880 and/or application software system 830, shown in FIG. 8, described below, and the entity graphs created by the graphing mechanism can be stored in one or more of the data stores of data storage system 880.

The entity graph 600 is dynamic (e.g., continuously updated) in that it is updated in response to occurrences of interactions between entities in an online system (e.g., a jobs platform or a user connection network) and/or computations of new inferred relationships between nodes of the graph. These updates are accomplished by real-time data ingestion and storage technologies, or by offline data extraction, computation, and storage technologies, or a combination of real-time and offline technologies. For example, the entity graph 600 is updated in response to user updates of user profiles, user views of job postings, user connections with other users, and user submissions of job applications. As another example, the entity graph 600 is updated as new computations are computed, for example, as new relationships between nodes are inferred based on statistical correlations, machine learning-based classifier output, or graph neural network output.

The entity graph 600 includes a knowledge graph that contains cross-application links. For example, job entities of a jobs graph that supports a jobs platform are linked with user entities of a user connection graph that supports a user connection network, via explicit and/or inferred edges of entity graph 600.

In the example of FIG. 6, entity graph 600 includes entity nodes, which represent entities, such as job nodes (e.g., Job 1, Job 2), user nodes (e.g., User 1, User 2, User 3, User 4), and post nodes (e.g., Post U21). Entity graph 600 also includes attribute nodes, which represent attributes of entities. Examples of attribute nodes include title nodes (e.g., Title J1, Title J2, Title U1), company nodes (e.g., Company 1), and skill nodes (e.g., Skill U11, Skill J11, Skill J21, Skill U31, Skill U41).

Entity graph 600 also includes edges. The edges individually and/or collectively represent various different types of relationships between or among the nodes. Data can be linked with both nodes and edges. For example, when stored in a data store, each node is assigned a unique node identifier and each edge is assigned a unique edge identifier. The edge identifier can be, for example, a combination of the node identifiers of the nodes connected by the edge and a timestamp that indicates the date and time at which the edge was created. For instance, in the graph 600, edges between user nodes can represent online social connections between the users represented by the nodes, such as 'friend' or 'follower' connections between the connected nodes. As an example, in the entity graph 600, User 3 is a first-degree Connection of User 1 by virtue of the CONNECTED edge between the User 3 node and the User 1 node, while User 2 is a second-degree Connection of User 3, although User 1 has a different type of connection, FOLLOWS, with User 2 than with User 3. User 4 is not connected with any of User 1, User 2, or User 3.

In the entity graph 600, edges can represent explicit relationships or links between the nodes connected by the edges. For instance, User 1 may be connected to Skill U11, Title U1, and Company 1 because the user associated with the User 1 node has the skill represented by the Skill U11 node explicitly listed in a "skills" section of the user's profile page in an online system (e.g., application software system 830) and the same user has the job title represented by the Title U1 node explicitly listed as the user's current job title on the user's profile page, and the same user has the company name represented by the Company 1 node explicitly listed as the user's current company on the user's profile page. Similarly, User 4 may be connected to Skill U41 because the user associated with the User 4 node has the skill represented by the Skill U41 node listed in a "skills" section of the user's profile page in the online system.

Additionally, the Job 1 node may be connected to the Title J1 node and the Skill J11 node because the job posting represented by the Job 1 node contains a job title that matches the job title represented by the Title J1 node and the job posting also contains the skill represented by the Skill J11 node. Likewise, the Job 2 node may be connected to the Title J2 node and the Skill J21 node because the job posting represented by the Job 2 node has a job title that matches the job title represented by the Title J2 node and the job posting contains the skill represented by the Skill J21 node.

As discussed above, match or matching as used herein may refer to an exact match or an approximate match, e.g., a match based on a computation of similarity between two pieces of data. An example of a similarity computation is cosine similarity. Other approaches that can be used to determine similarity between or among pieces of data include clustering algorithms (e.g., k means clustering), binary classifiers trained to determine whether two items in a pair are similar or not similar, and neural network-based vectorization techniques such as WORD2VEC. In some implementations, generative language models are used to determine similarity of pieces of data. For example, a prompt is formulated that instructs a generative language model to find a skill related to a particular job title, and the generative language model returns a set of one or more skills based on the input job title.

In the entity graph 600, edges can represent activities involving the entities represented by the nodes connected by the edges. For example, a POSTED edge between the User 2 node and the Post U21 node indicates that the user represented by the User 2 node posted the digital content item represented by the PostU21 node to the application software system (e.g., as an article posted to a user connection network). As another example, a HIRED edge between the Job 2 node and the User 3 node indicates that the user represented by the User 3 node was hired for the job represented by the Job 2 node. Similarly the APPLIED edge between the User 4 node and the Job 2 node indicates that the user represented by the User 4 node applied for but was not hired for the job represented by the Job 2 node.

In some implementations, combinations of nodes and edges are used to compute various scores, and those scores are used by various components of the description generation system 840 to, for example, generate prompts, generate descriptions, and rank feedback. For example, a score that measures the affinity of the user represented by the User 4 node to the job represented by the Job 1 node can be computed using a path p1 that includes a sequence of edges between the nodes User 4, Job 2, Skill J21, and Job 1 and/or a path p2 that includes a sequence of edges between the nodes User 4, Job 2, User 3, Skill U31, and Job 1 and/or a path p3 that includes a sequence of edges between the nodes User 4, Job J2, User 3, User 1, Job 1, and/or a path p4 that includes a sequence of edges between the nodes User 4, Job 2, Title J2, Title J1, Job 1. Any one or more of the paths p1, p2, p3, p4 and/or other paths through the graph 600 can be used to compute scores that represent affinities, relationships, or statistical correlations between different nodes. For instance, based on relative edge counts, a title-skill affinity score computed between Title J1 and Skill J21 might be higher than the title-skill affinity score computed between the Title J1 and Skill U41.

In the entity graph 600, edges can represent inferred relationships between nodes, such as computed measures of similarity or affinity between the nodes connected by the edges. In entity graph 600, edges I1, I2, I3, I4, and I5 represent examples of inferred relationships between nodes. Edge I1 represents an inferred relationship between Post U21 and Company 1. The relationship between Post U21 and Company 1 can be inferred, for example, by traversing the path between Company 1, User 1, User 2, and Post U21. For example, given that User 1 is employed by Company 1 and follows User 2, and User 2 posts Post U21, textual similarity or semantic similarity between the Post U21 and Company 1 is measured. Supposing that Post U21 contains a mention of the company name represented by the Company 1 node, the measure of textual similarity or semantic similarity between the Post U21 and Company 1 satisfies a threshold similarity criterion. Based on the textual similarity or semantic similarity measure, the inferred link I1 is created between Post U21 and Company 1 (e.g., Post U21 is an article that talks about Company 1 and contains a description of Company 1).

Edge I2 represents an inferred relationship between the Job 1 node and the Post U21 node. The relationship between the Job 1 node and the Post U21 node can be inferred, for example, by traversing the path between Job 1, User 1, Company 1, and Post U21. For example, given that User 1 created the job posting represented by the Job 1 node, and the fact that User 1 is employed by Company 1, it can be inferred that the job posting for Job 1 is for a job at Company 1. Given that the link I1 is inferred between Company 1 and Post U21, then a company description for the job posting for Job 1 can be generated (e.g., by a generative language model) based on the description of Company 1 contained in the Post U21. For example, the Post U21 or a portion of it can be used as an input to a generative language model along with an instruction for the generative language model to create a summary of the Post U21, and then the subsequent output of the generative language model can be used as a company description to be included in the job posting for Job 1.

Edge I3 represents an inferred relationship between the Job 1 node and the Skill U31 node. The relationship between the Job 1 node and the Skill U31 node can be inferred, for example, based on a measure of textual or semantic similarity between Skill U31 and Skill J11 or Title J1. Alternatively or in addition, the relationship between the Job 1 node and the Skill U31 node can be inferred, for example, based on a selection by User 1 of User 3 as a selected suggested user (e.g., an ideal job candidate, via user interface 300 or user interface 400, described above). In other words, since the job posting user, User 1, is connected to User 3, User 3 is suggested to User 1 as a potential ideal candidate for Job 1. If User 1 selects User 3, then User 3's skills, including Skill U31, are included in the generation of the job posting for Job 1 (e.g., User 3's skills are incorporated into the prompt configured for the generative language model to generate a job description for Job 1). As a result of User 1's selection of User 3 as a potentially ideal candidate for Job 1, the inferred link I3 is created between Skill U31 and Job 1.

Edge I4 represents an inferred relationship between the Job 1 node and the Skill J21 node. The relationship between the Job 1 node and the Skill J21 node can be inferred, for example, based on the path between User 1, User 3, Job 2, and Skill J21, and a textual or semantic similarity between Job 1 and Job 2. For example, given that User 3 is connected to User 1. User 3 was hired for Job 2, Job 2 requires Skill J21, and Job 2 is similar to Job 1, the inferred link I4 is created between Job 1 and Skill J21 to indicate that Skill J21 has a likelihood of being relevant to Job 1.

Edge I5 represents an inferred relationship between the Title J1 node and the Title J2 node. The relationship between the Title J1 node and the Title J2 node can be inferred, for example, based on a textual or semantic similarity between the Title J1 node and the Title J2 node, or based on the path between User 1, User 3, Job 2, and Title J2. For example, if User 1 is connected to User 3 and User 1 has selected User 3 as a potentially ideal candidate for Job 1, then given that User 3 was hired for Job 2 and Title J2 represents the job title for Job 2, then the inferred link I5 is created between Title J2 and Title J1.

Also in FIG. 6, no inferred links are created between Skill U41 and Job 1 because User 4 applied for Job 2 but was not hired for Job 2. In a similar way, no inferred links are created between Skill U11 or Title U1 and Job 1 because Skill U11 and Title U1 are linked with the posting user, User 1, who is creating the job posting for Job 1, and not with an ideal candidate for Job 1.

As illustrated by the examples shown in FIG. 6, inferred links can be created where no explicit links exist, and the inferred links can be used to identify relevant inputs to be included in a prompt for a generative language model to output a job description for a particular job. The examples shown in FIG. 6 and the accompanying description, above are provided for illustration purposes. This disclosure is not limited to the described examples.

FIG. 7 is a graphical representation 700 of examples of mappings that can be used to generate inferred data in accordance with some embodiments of the present disclosure. For example, the mappings shown in FIG. 7 can be, or can be derived from, a portion of an entity graph such as entity graph 510 including knowledge graph 512, e.g., entity graph 600.

In the example of FIG. 7, data entities are represented by rectangular boxes and mappings 702, 704, 706, 708, and 710 are represented by connections between the boxes. The connections or mappings can represent inferred or explicit relationships between data entities. For example, an explicit relationship between a user and a skill can occur when a user lists a particular skill in an online user profile. An inferred relationship between a job title and a skill can be created based on statistics that are generated based on many users' online interactions. For instance, a statistical analysis of online interactions between users and online job postings can be used to identify or determine inferred relationships (or mappings) between, for example, job titles and skills. As an example, a statistical correlation between a job title and a skill can be determined based on users' online interactions with various job postings. If the statistical correlation between a job title and a skill is higher than a threshold confidence value (e.g., greater than eighty or ninety percent), a link between the job title and the skill can be inferred. If the statistical correlation between the user and the skill is lower than the threshold confidence value (e.g., less than eighty or ninety percent), a link between the user and the skill is not implied (or inferred) based on the statistics.

In an application software system 830, a user can create a profile. In FIG. 7, a user profile includes a mapping 710 of user identifier data, attribute data, and network activity data. For example, attribute data and network activity data are linked by a common value of the user identifier. FIG. 7 shows examples of profile data for N users, where N is a positive integer that represents the number of users having profiles in the application software system.

User profile data are linked with skill set data by mapping 708. For example, a link between a user's attribute data and a skill set is created when the user's attribute data contains information, such as a job title or job description, that matches the skill set. Similarly, a link between a user's network activity data and a skill set is created when the user's network activity includes activity that matches the skill set, such as conducting a job search that includes a search term that matches the skill set or viewing a job posting that contains the skill set.

Skill set data are linked with job titles by mapping 706. For example, a link between a skill set and a job title is created when a similarity score for a skill set-job title combination is greater than a threshold similarity score value, where the threshold similarity score value can be determined based on the requirements of a particular design or implementation of the description generation system.

Job title data are linked with jobs, e.g., job postings that contain generative language model-generated job descriptions, by mapping 704. For example, a link between a job title and a job is created when the job posting contains words or phrases that match a job title. Whether a job posting contains words or phrases that match a job title can be determined using, for example, topic modeling or similarity computations.

Job data are linked with company data, e.g., company profiles that contain company descriptions, including generative language model-generated company descriptions, by mapping 702. For example, a link between a job and a company is created when a job posting contains words or phrases that match a company name or company description. Whether a job posting contains words or phrases that match a company can be determined using, for example, topic modeling or similarity computations. Company as used herein may refer to any organization that is capable of generating job postings, including organizations, educational institutions, and other entities.

Mappings can include other mappings. For example, a mapping that includes mapping 710 and mapping 708 can be used to link a user with a skill set. Similarly, a mapping that includes mappings 708, 706, and 704 can be used to link a user with a job. Likewise, a mapping that includes mappings 706 and 704 can be used to link a skill set with a job, e.g., a job posting that contains a generative language model-generated job description.

The examples shown in FIG. 7 and the accompanying description, above are provided for illustration purposes. This disclosure is not limited to the described examples.

Figure 8:
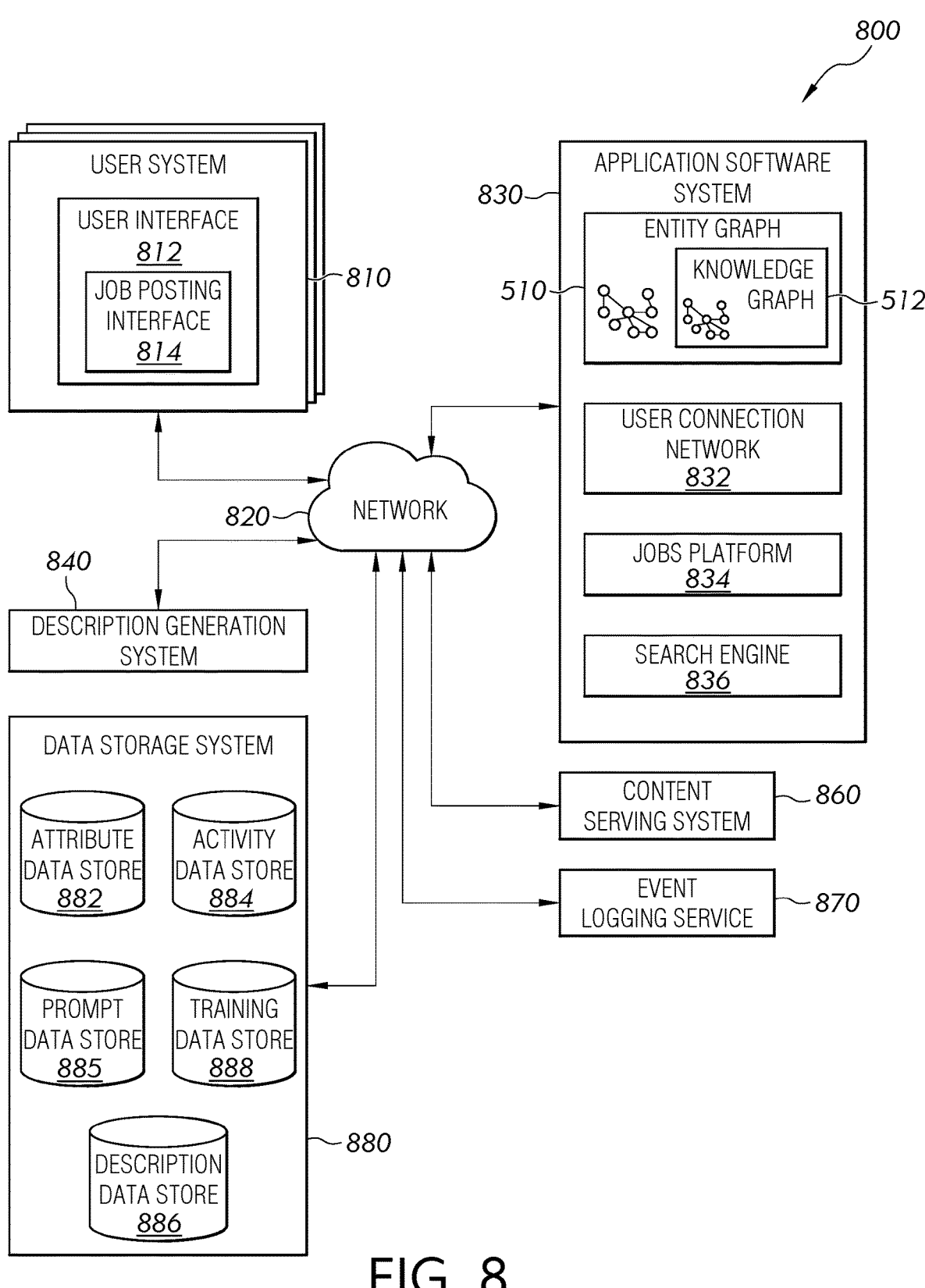
FIG. 8 is a block diagram of a computing system that includes a description generation system in accordance with some embodiments of the present disclosure.

FIG. 8 is a block diagram of a computing system that includes a description generation system 840 in accordance with some embodiments of the present disclosure.

In the embodiment of FIG. 8, a computing system 800 includes one or more user systems 810, a network 820, an application software system 830, a description generation system 840, a content serving system 860, an event logging service 870, and a data storage system 880. Components of the computing system 800 including the description generation system 840 are described in more detail below.

A user system 810 includes at least one computing device, such as a personal computing device, a server, a mobile computing device, or a smart appliance, and at least one software application that the at least one computing device is capable of executing, such as an operating system or a front end of an online system. Many different user systems 810 can be connected to network 820 at the same time or at different times. Different user systems 810 can contain similar components as described in connection with the illustrated user system 810. For example, many different end users of computing system 800 can be interacting with many different instances of application software system 830 through their respective user systems 810, at the same time or at different times.

User system 810 includes a user interface 812. User interface 812 is installed on or accessible to user system 810 by network 820. For example, embodiments of user interface 812 include a job posting interface 814. Job posting interface 814 includes, for example, a graphical display screen that includes at least one slot. A slot as used herein refers to a space on a graphical display such as a web page or mobile device screen, into which digital content items such as job postings can be loaded for display to the user. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system.

User interface 812 can be used to input data, upload, download, receive, send, or share content items, including job postings, to initiate user interface events, and to view or otherwise perceive output such as data and/or digital content produced by application software system 830, description generation system 840, and/or content serving system 860. For example, user interface 812 can include a graphical user interface (GUI), a conversational voice/speech interface, a virtual reality, augmented reality, or mixed reality interface, and/or a haptic interface. User interface 812 includes a mechanism for logging in to application software system 830, clicking or tapping on GUI user input control elements, and interacting with job posting interface 814 and digital content items such as machine-generated job descriptions. Examples of user interface 812 include web browsers, command line interfaces, and mobile app front ends. User interface 812 as used herein can include application programming interfaces (APIs).

In the example of FIG. 8, user interface 812 includes job posting interface 814. Job posting interface 814 includes a front end user interface component of description generation system 840 or application software system 830. Job posting interface 814 is shown as a components of user interface 812 for ease of discussion, but access to job posting interface 814 can be limited to specific user systems 810. For example, in some implementations, access to job posting interface 814 is limited to users of description generation system 840 or application software system 830 who have been designated as job posters or who have been invited to use functionality that provides job descriptions output by a generative language model for job postings.

Network 820 is an electronic communications network. Network 820 can be implemented on any medium or mechanism that provides for the exchange of digital data, signals, and/or instructions between the various components of computing system 800. Examples of network 820 include, without limitation, a Local Area Network (LAN), a Wide Area Network (WAN), an Ethernet network or the Internet, or at least one terrestrial, satellite or wireless link, or a combination of any number of different networks and/or communication links.

Application software system 830 is any type of application software system that provides or enables the creation, upload, and/or distribution of at least one form of digital content, including machine-generated descriptions such as job descriptions, between user systems, such as user system 810, through user interface 812. In some implementations, portions of description generation system 840 are components of application software system 830. Examples of application software system 830 include a user connection network 832, a jobs platform 834, and a search engine 836. User connection network 843 includes, for instance, professional social network software and/or other social graph-based applications. Jobs platform 834 includes a job site or a job posting system, for example, Search engine 836 includes a search engine that enables users of application software system 830 to search for entity profiles on user connection network 832 and/or search for job postings on jobs platform 834. Application software system 830 can include online systems that do not provide social network services, general-purpose search engines, specific-purpose search engines, messaging systems, content distribution platforms, e-commerce software, enterprise software, or any combination of any of the foregoing or other types of software.

A front end portion of application software system 830 can operate in user system 810, for example as a plugin or widget in a graphical user interface of a web application, mobile software application, or as a web browser executing user interface 812. In an embodiment, a mobile app or a web browser of a user system 810 can transmit a network communication such as an HTTP request over network 820 in response to user input that is received through a user interface provided by the web application, mobile app, or web browser, such as user interface 812. A server running application software system 830 can receive the input from the web application, mobile app, or browser executing user interface 812, perform at least one operation using the input, and return output to the user interface 812 using a network communication such as an HTTP response, which the web application, mobile app, or browser receives and processes at the user system 810.

In the example of FIG. 8, application software system 830 includes an entity graph 510, e.g., a knowledge graph 512. As described in more detail with reference to FIG. 5 and FIG. 6, entity graph 510 and/or knowledge graph 512 can be used to compute various types of affinity scores, similarity measurements, and/or statistics between or relating to entities. Entity graph 510, 512 is a graph-based representation of data stored in data storage system 880, described below. For example, entity graph 510, 512 represents entities, such as users, organizations, and content items, such as job postings, as nodes of a graph. Entity graph 510, 512 represents relationships, also referred to as mappings or links, between entities as edges, or combinations of edges, between the nodes of the graph. In some implementations, mappings between different pieces of data used by application software system 830 are represented by one or more entity graphs.

Mappings can be created based on explicit relationships between entities in the entity graph 510, 512 and/or inferred relationships between entities that are based on, for example, statistical correlations. For instance, a statistical analysis of online interactions between users and job postings can be used to identify or determine inferred relationships between, for example, different pieces of position-related data, such as skills and job titles. As an example, a statistical correlation between different pieces of position-related data, e.g., a skill and a job title, can be determined based on users' online interactions with various job postings. If the statistical correlation between a job title and a skill is higher than a threshold confidence value (e.g., greater than eighty or ninety percent), a link between the job title and the skill can be inferred. If the statistical correlation between the job title and the skill is lower than the threshold confidence value (e.g., lower than eighty or ninety percent), a link between the job title and the skill may not be implied based on the statistics. A graphical representation of examples of mappings is shown in FIG. 7, described above.

Portions of entity graph 510, 512 can be re-generated or updated based on changes and updates to the stored data. Also, entity graph 510, 512 can refer to an entire system-wide entity graph or to only a portion of a system-wide graph. For instance, entity graph 510, 512 can refer to a subset of a system-wide graph, where the subset pertains to a particular user or group of users of application software system 830, or to a particular content item or group of content items distributed by application software system 830. An example of an entity graph is shown in FIG. 6, described below.

In some implementations, knowledge graph 512 is a subset or a superset of entity graph 510. For example, in some implementations, knowledge graph 512 includes multiple different entity graphs 510 that are joined by edges, such as edges that represent inferred relationships. For instance, knowledge graph 512 can join entity graphs 510 that have been created across multiple different databases or software products. In some implementations, the entity nodes of the knowledge graph 512 represent concepts, such as product surfaces, verticals, or application domains. In some implementations, knowledge graph 512 includes a platform that extracts and stores different concepts across multiple different software applications. Examples of concepts include job, resume, learning course, and news feed. The knowledge graph 512 can be used to generate and export content and entity-level embeddings that can be used to discover or infer new interrelationships between entities and/or concepts, which then can be used to identify related entities. As with other portions of entity graph 510, knowledge graph 512 can be used to compute various types of affinity scores, similarity measurements, and/or statistical correlations between entities and/or concepts.

Knowledge graph 512 is a graph-based representation of data stored in data storage system 880, described below. Knowledge graph 512 represents relationships, also referred to as mappings, between entities or concepts as edges, or combinations of edges, between the nodes of the graph. In some implementations, mappings between different pieces of data used by application software system 830 or across multiple different application software systems are represented by the knowledge graph 512.

Mappings can be created based on explicit relationships between entities in the knowledge graph 512 and/or inferred relationships between entities that are based on, for example, statistical calculations. For instance, a statistical analysis of online interactions between users and online job applications can be used to identify or determine inferred relationships between, for example, different pieces of position-related data, such as job titles and skills. As an example, a statistical correlation between a job title and a skill can be determined based on a history of users' online interactions with various job postings. If the statistical correlation between a job title and a skill is higher than a threshold confidence value (e.g., greater than eighty or ninety percent), a link between the job title and the skill can be implied. If the statistical correlation between the job title and the skill is lower than the threshold confidence value (e.g., lower than eighty or ninety percent), a link between the job title and the skill may not be implied based on the statistics. Portions of knowledge graph 512 can be re-generated or updated based on changes and updates to the stored data. Also, knowledge graph 512 can refer to an entire system-wide knowledge graph or to only a portion of a system-wide knowledge graph.

In the example of FIG. 8, application software system 830 includes a search engine 836. Search engine 836 is a software system designed to search for and retrieve information by executing queries on data stores, such as databases, connection networks, and/or graphs. The queries are designed to find information that matches specified criteria, such as keywords and phrases. For example, search engine 836 is used to retrieve data by executing queries on various data stores of data storage system 880 or by traversing entity graph 510, 512.

Description generation system 840 auto-generates job descriptions for, e.g., job postings, using a generative language model, based on input received via job posting interface 814 and other data sources. In some implementations, description generation system 840 receives a small amount of structured, explicit, validated position-related data from a posting user via job posting interface 814, generates inferred position-related data based on the structured, explicit, validated position-related data, and formulates a prompt for a generative language model based on a combination of the small amount of structured, explicit, validated position-related data and the inferred position-related data. Description generation system 840 receives a machine-generated job description from the generative language model, which the generative language model outputs based on the prompt. Description generation system 840 sends the machine-generated job description to job posting interface 814 for display to the posting user. Additional or alternative features and functionality of description generation systems described herein are included in description generation system 840 in various embodiments.

Content serving system 860 includes a data storage service, such as a web server, which stores digital content items, including job postings that include job descriptions generated by generative language models, and distributes digital content items, including job descriptions generated by generative language models, to, for example, web sites and mobile apps or to particular slots of web sites or mobile app user interface display screens, using network 820. For instance, content serving system 860 scores and ranks digital content items, including job descriptions, for placement in user feeds.

In some embodiments, content serving system 860 processes requests from, for example, application software system 830, and distributes digital content items, including job descriptions generated by generative language models, to user systems 810 or other destinations, in response to requests. A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click or a page load. In some implementations, content serving system 860 is part of application software system 830 or description generation system 840. In other implementations, content serving system 860 interfaces with a description distribution subsystem of description generation system 840. For example, once the description distribution subsystem has distributed a job posting to a network, e.g., a network of users of application software system 830, content serving system 860 determines the target destinations and timing for delivery of the job postings to various end user devices on the network.

Event logging service 870 captures and records network activity data generated during operation of application software system 830, including user interface events generated at user systems 810 via user interface 812, in real time, and formulates the user interface events into a data stream that can be consumed by, for example, a stream processing system. Examples of network activity data include page loads, clicks on content items or graphical user interface control elements, views of content items, contributions, posts, and social action data such as likes, shares, comments, and social reactions (e.g., "insightful," "curious," etc.). For instance, when a user of application software system 830 via a user system 810 clicks on a user interface element, such as a content item, a link, or a control such as a view, comment, share, or reaction button, or uploads a file, or creates a contribution or a post, loads a web page, or scrolls through a feed, etc., event logging service 870 fires an event to capture an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web or mobile.

For instance, when a user creates a job posting, or inputs a social action on a post, event logging service 870 stores the corresponding event data in a log. Event logging service 870 generates a data stream that includes one record of real-time event data for each user interface event that has occurred. Event data logged by event logging service 870 can be used, for example, to generate affinity scores, similarity measurements, and/or to train machine learning models.

Data storage system 880 includes data stores and/or data services that store digital data received, used, manipulated, and produced by application software system 830 and/or description generation system 840, including descriptions and other content, metadata, prompts, attribute data, network activity data, machine learning model training data, machine learning model parameters, and machine learning model inputs and outputs.

In the example of FIG. 8, data storage system 880 includes an attribute data store 882, an activity data store 884, a prompt data store 885, a description data store 886, and a training data store 888. Attribute data store 882 stores data relating to users, and other entities, such as position-related data, e.g., job titles and skill set data, which is used by the description generation system to, for example, generate prompts and compute statistics, similarity measurements, and affinity scores. Activity data store 884 stores data relating to network activity, e.g., user interface event data extracted from application software system 830 by event logging service 870, which is used by the description generation system 840 to, for example, generate inferred data.

Prompt data store 885 stores prompt templates and related metadata, which are generated and used be the description generation system 840 to generate job descriptions using a generative language model. Description data store 886 stores job descriptions generated by generative language models, related metadata, and related data, such as human-edited versions of machine-generated job descriptions. Training data store 888 stores data generated by the description generation system 840 that can be used to train or fine tune generative language models and/or other machine learning models, such as pre-publication feedback data 530 and post-publication feedback data 532.

In some embodiments, data storage system 880 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 880 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 880 resides on at least one persistent and/or volatile storage device that can reside within the same local network as at least one other device of computing system 800 and/or in a network that is remote relative to at least one other device of computing system 800. Thus, although depicted as being included in computing system 800, portions of data storage system 880 can be part of computing system 800 or accessed by computing system 800 over a network, such as network 820.

While not specifically shown, it should be understood that any of user system 810, application software system 830, description generation system 840, content serving system 860, event logging service 870, and data storage system 880 includes an interface embodied as computer programming code stored in computer memory that when executed causes a computing device to enable bidirectional communication with any other user system 810, application software system 830, description generation system 840, content serving system 860, event logging service 870, and data storage system 880 using a communicative coupling mechanism. Examples of communicative coupling mechanisms include network interfaces, inter-process communication (IPC) interfaces and application program interfaces (APIs).

Each of user system 810, application software system 830, description generation system 840, content serving system 860, event logging service 870, and data storage system 880 is implemented using at least one computing device that is communicatively coupled to electronic communications network 820. Any of user system 810, application software system 830, description generation system 840, content serving system 860, event logging service 870, and data storage system 880 can be bidirectionally communicatively coupled by network 820. User system 810 as well as other different user systems (not shown) can be bidirectionally communicatively coupled to application software system 830 and/or description generation system 840.

A typical user of user system 810 can be an administrator or end user of application software system 830, description generation system 840 and/or content serving system 860. User system 810 is configured to communicate bidirectionally with any of application software system 830, description generation system 840, and/or content serving system 860 over network 820.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 810, application software system 830, description generation system 840, content serving system 860, event logging service 870, and data storage system 880 are implemented using computer software, hardware, or software and hardware, and can include combinations of automated functionality, data structures, and digital data, which are represented schematically in the figures. User system 810, application software system 830, description generation system 840, content serving system 860, event logging service 870, and data storage system 880 are shown as separate elements in FIG. 8 for ease of discussion but, except as otherwise described, the illustration is not meant to imply that separation of these elements is required. The illustrated systems, services, and data stores (or their functionality) of each of user system 810, application software system 830, description generation system 840, content serving system 860, event logging service 870, and data storage system 880 can be divided over any number of physical systems, including a single physical computer system, and can communicate with each other in any appropriate manner.

Figure 15:
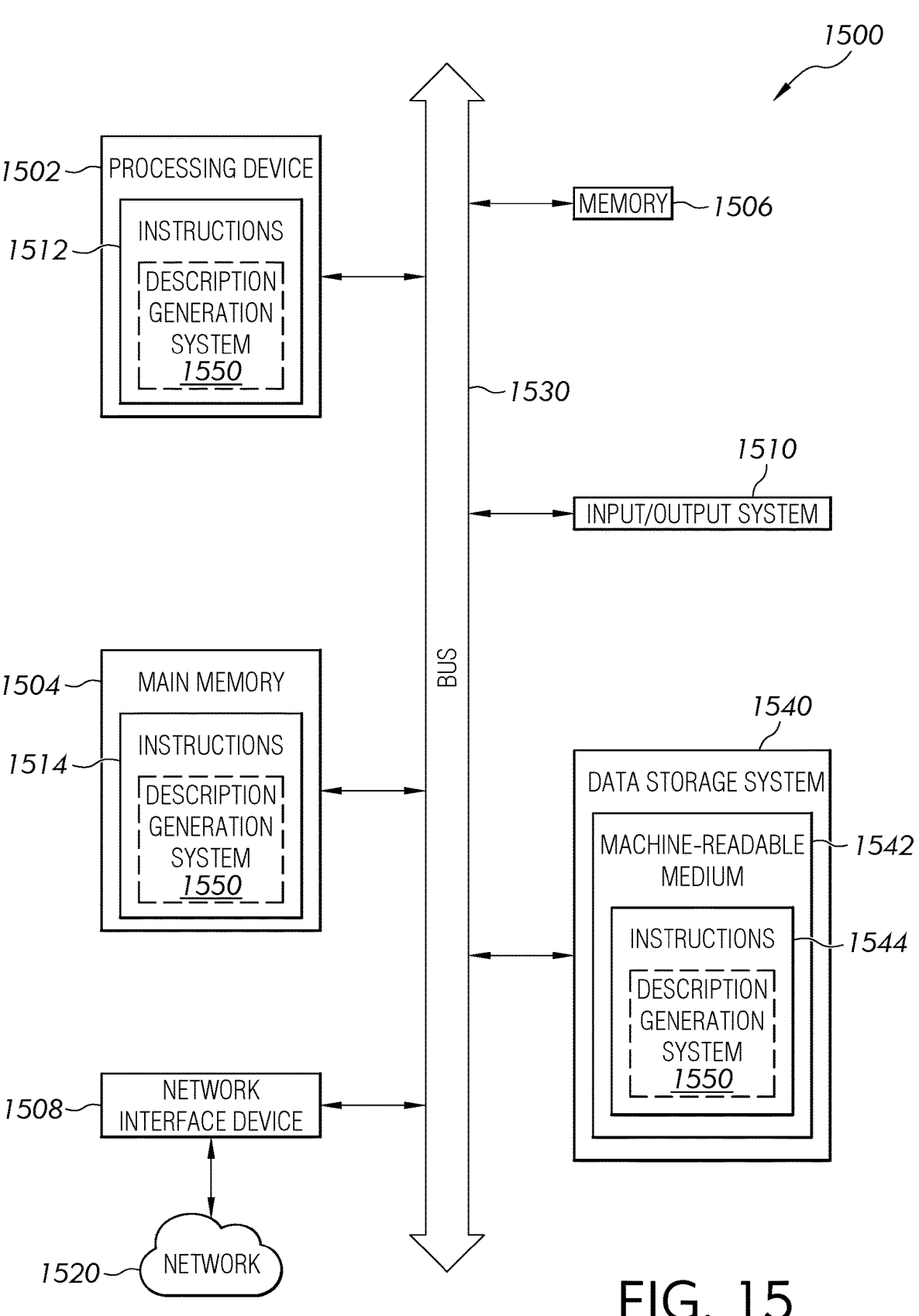
FIG. 15 is a block diagram of an example computer system including components of a description generation system in accordance with some embodiments of the present disclosure.

In FIG. 15, the combination of job posting interface 814 and description generation system 840 is collectively represented as description generation system 1550 for case of discussion only. Job posting interface 814 and description generation system 840 are not required to be implemented all on the same computing device, in the same memory, or loaded into the same memory at the same time. For example, access to either or both of job posting interface 814 and description generation system 840 can be limited to different, mutually exclusive sets of user systems. Additionally, while job posting interface 814 typically may be implemented on user systems, description generation system 840 typically may be implemented on a server computer or group of servers. In some implementations, one or more portions of description generation system 840 are implemented on a server computer capable of establishing an electronic communication connection with a client device, such as a mobile computing device, a wearable computing device, a laptop computer, or a desktop computer, directly or via a network, which operations job posting interface 814. In other implementations, one or more portions of description generation system 814 are implemented on a client device (e.g., without the need to communicate with a network or a server computer), alone or in combination with job posting interface 814. For instance, one or more portions of the described machine learning architecture and/or the generative language model are implemented on the client device, in some implementations. Further details with regard to the operations of description generation system 1550 are described below.

FIG. 9 is a flow diagram of an example method for automated description generation using components of a description generation system in accordance with some embodiments of the present disclosure.

The method 900 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by components of description generation system 840 of FIG. 8. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 9, description generation system 840 includes an entity selection subsystem 902, an inferred data generation subsystem 906, a prompt generation subsystem 910, a description generation subsystem 914, a pre-distribution feedback subsystem 918, a description distribution subsystem 924, and a post-distribution feedback subsystem 928. Other implementations of description generation system 840 include some or all of the components shown in FIG. 9 and/or other components.

Entity selection subsystem 902 includes one or more computer programs or routines that selects a set of one or more users of a job posting system, e.g., jobs platform 834, to receive a notification about the availability of the functionality of description generation system 840. In some implementations, the execution of entity selection subsystem 902 is initiated by an API call from description generation system 840 or application software system 830. In some implementations, the notification includes a display, in the job posting system, of a user-selectable graphical user interface control element for auto-generating a job description using a generative language model, such as GUI control element 206 of FIG. 2, described above. For example, the GUI control element 206 is displayed in a user interface of the job posting system for selected users and not displayed for other users of the job posting system. Alternatively or in addition, the notification to the selected users includes an electronic message, such as an email, an asynchronous message, or a notification placed in the user's notification inbox or notifications page.

In some implementations, entity selection subsystem 902 includes a process for filtering users out of the set of selected users if the users have a history of being flagged for posting inappropriate content or other violations of policies or terms of service of the job posting system or user connection network. For instance, entity selection subsystem 902 queries a database that stores data relating to flagged or reported users and if any user identifiers in that database match any user identifiers in the set of selected users, the users are removed from the set of selected users.

To select users to receive a notification about the functionality of the description generation system, entity selection subsystem 902 extracts information from the user connection network, e.g., user connection network 832, generates scores based on the extracted information, ranks users based on the scores, and selects the set of users based on the rankings. For instance, entity selection subsystem 902 selects the users having the top k highest scores, where k is a positive integer whose value is configurable based on the requirements of a particular design or implementation of the description generation system 940. As an example, entity selection subsystem 902 generates a set of users whose associated user profiles in the user connection network list hiring manager or a similar title as their current job title or whose company size is less than a threshold number of employees (e.g., less than 20, 50, or 100 employees), generates activity scores the users in that set based on the users' recent job posting activity on the jobs platform.

For instance, users who have generated fewer job postings historically or in a recent previous time period and users employed by smaller companies are ranked higher than users who frequently generate job postings or are employed by larger companies, in some implementations. In other implementations, the frequently posting users or those employed by larger companies are ranked higher than the infrequent job posters and users from smaller companies. The scoring and ranking scheme used to select users to be notified of the features and functionality of the description generation system 840 can be customized according to the requirements of a particular design or implementation. Each of the selected one or more entities, e.g., users of the job posting system, is output by entity selection subsystem 902 as selected entity 904.

Inferred data generation subsystem 906 includes one or more computer programs or routines that auto-generate inferred position-related data based on explicit position-related data. In some implementations, the execution of inferred data generation subsystem 906 is initiated by an API call from description generation system 840 or application software system 830. In an example, in response to a selected entity 904 selecting a description generation GUI control element, such as GUI control element 206 of FIG. 2, described above, inferred data generation subsystem 906 extracts inferred position-related data from a user connection network, e.g., user connection network 832 based on explicit position-related data that has been passed to inferred data generation subsystem 906 by the jobs platform, such as position-related data input by the user into the online form of user interface 100 of FIG. 1, described above. The process of extracting inferred data includes creating inferred links between nodes of an entity graph or knowledge graph, in some implementations, as shown and described above with reference to FIG. 6 and FIG. 7. Example operations of inferred data generation subsystem 906 are described above with reference to inferred data generator 514 of FIG. 5 and below with reference to FIG. 10. Inferred data generation subsystem 906 outputs the explicit data, e.g., the position-related data received from user interface 100, and the corresponding inferred data extracted from the user connection network, as explicit data and inferred data 908.

In some implementations, inferred data generation subsystem 906 outputs both the position-related data and associated weight values. For example, the inferred data and the explicit data can be weighted differently based on various factors. In some instances, the inferred data may be considered more reliable than the explicit data, where the reliability of the explicit data can be determined based on user attribute data and/or network activity data associated with the posting user. For instance, if a job poster provides explicit data for a current posting that includes a job title of senior software engineer and a specific combination of salary and benefits, but the job poster's historical job posting activity includes a previous job posting for entry-level software engineer with the same combination of salary and benefits, the inconsistencies between the two instances of explicit data provided by the job poster can be a signal to inferred data generation subsystem 906 to down weight the job poster's explicit data for the current posting. As a another example, different types of inferred data can be weighted differently, for instance, certain skill keywords can be weighted more highly than other skill keywords based on confidence values associated with the respective machine-generated inferences that produced the skill keywords.

Prompt generation subsystem 910 includes one or more computer programs or routines that generate and output one or more prompts for a generative language model, such as prompt 912, based on explicit data and inferred data 908. In some implementations, the execution of prompt generation subsystem 910 is initiated by an API call from description generation system 840 or application software system 830. The process of auto-generating a prompt for a generative language model includes prompt generation subsystem 910 applying a prompt template to the explicit data and inferred data 908. Examples of the process of auto-generating a prompt for a generative language model are shown and described above with reference to FIG. 5. Example operations of prompt generation subsystem 910 are described below with reference to FIG. 11 and FIG. 12. Prompt generation subsystem 910 outputs the prompt 912.

Description generation subsystem 914 includes one or more computer programs or routines that obtain prompt 912 produced by prompt generation subsystem 910 and apply a generative language model to prompt 912. Examples of generative language models are described above, for example with reference to FIG. 5. In some implementations, the execution of description generation subsystem 914 is initiated by an API call from description generation system 840 or application software system 830. In response to input of prompt 912 into the generative language model, the generative language model of description generation subsystem 914 produces and outputs description 916, which is based on the prompt 912. Description 916 includes, for example, a piece of writing, e.g., a description, for instance a machine-generated job description. An example of description 916 is described above with reference to FIG. 1, FIG. 2, FIG. 3, and FIG. 4. An implementation of description generation subsystem 914 is described in more detail below with reference to FIG. 13.

Description generation subsystem 914 outputs description 916 directly to description distribution subsystem 924, in some instances. In other instances, description generation subsystem 914 outputs description 916 to pre-distribution feedback subsystem 918, which outputs edited description 922 to description distribution subsystem 924.

In some implementations, prompt-content pairs, such as a prompt 912 and a corresponding machine-generated description 916 generated by the generative language model of description generation subsystem 914 based on the prompt 912, are returned to either or both of prompt generation subsystem 910 and description generation subsystem 914 as pre-publication feedback 920. For example, prompt generation subsystem 910 uses prompt 912-description 916 pairs to score and select prompt templates for future prompts. As another example, description generation subsystem 914 formulates training data based on generated prompt 912-description 916 pairs and uses the training data to train or fine tune the generative language model of description generation subsystem 914 or a generative language model used by prompt generation subsystem 910 (which may be the same as the generative language model used by description generation subsystem 914 or one or more different generative language models).

Pre-distribution feedback subsystem 918 includes one or more computer programs or routines that obtain description 916 produced by description generation subsystem 914 and apply a set of one or more pre-publication feedback mechanisms to generated edited description 922 before the description 916 is distributed or surfaced to a human user for evaluation. In some implementations, the execution of pre-distribution feedback subsystem 918 is initiated by an API call from description generation system 840 or application software system 830. In some examples, the set of pre-publication feedback mechanisms can function as a substitute for human review using, e.g., scoring models that have been trained on the results of actual previously conducted human reviews.

The set of pre-publication feedback mechanisms includes filtering mechanism 526, described above, in some implementations. For example, pre-distribution feedback subsystem 918 includes a set of scoring models and/or a set of classification models that score or label the description 916 based on a comparison of the description 916 to one or more different categories or ground-truth examples. The different categories or ground-truth examples against which the description 916 are compared can be determined and varied based on the requirements of a particular design of the description generation system 840, and can include, for example, categories or examples used by various types of spam filters and/or relevance ranking models. In some implementations, pre-distribution feedback subsystem 918 also or alternatively includes one or more editing tools for human reviewers, such as user interface 300 or user interface 400, described above.

Any one or more of the outputs generated by any of the components of pre-distribution feedback subsystem 918 can be returned to prompt generation subsystem 910 and/or description generation subsystem 914 to be used to formulate pre-publication feedback 920. For example, pre-publication feedback 920 can include a score or label generated by a spam filter or relevance model of pre-distribution feedback subsystem 918 for a particular item of description 916 based on a particular prompt 912, where the score or label is joined with the respective description 916 and/or the respective prompt 912 to form the pre-publication feedback 920. Join as used herein may refer to a concatenation function, a database join operation, a reference or pointer, or another mechanism that links different pieces of data with each other.

Similarly, the pre-publication feedback 920 can include a rating and/or one or more edits generated by e.g., user interface 300 or user interface 400, described above, for a particular description 916 based on a particular prompt 912, where the rating and/or edits are joined with the respective description 916 and/or the respective prompt 912 to form the pre-publication feedback 920. The pre-publication feedback 920 generated by pre-distribution feedback subsystem 918 is used by prompt generation subsystem 910 to, for example, score and select prompt templates for future prompts. As another example, description generation subsystem 914 formulates training data based on pre-publication feedback 920 generated by pre-distribution feedback subsystem 918 and uses the training data to train or fine tune the generative language model of description generation subsystem 914 or a generative language model used by prompt generation subsystem 910.

Pre-distribution feedback subsystem 918 generates and outputs edited description 922. In some cases, edited description 922 includes description 916 that has passed through one or more of the filters of pre-distribution feedback subsystem 918. For example, edited description 922 includes description 916 that is not labeled as any type of spam, has a relevance score that exceeds a relevance score threshold, has a rating score that exceeds a rating score threshold, or has been reviewed and/or edited and/or approved by a human reviewer through a pre-publication editing tool such as the editing tools shown in user interface 200, user interface 300, and user interface 400, described above.

Description distribution subsystem 924 includes one or more computer programs or routines that formulate description 916 or edited description 922, as the case may be, into a distributable item, e.g., a job posting, and causes the distributable item to be distributed to a network, such as a user connection network, via a jobs platform, for example. In some implementations, the execution of description distribution subsystem 924 is initiated by an API call from description generation system 840 or application software system 830. Distributing a distributable item as described herein includes distributing a job posting that includes a machine-generated job description to one or more user accounts of an online system such as application software system 830, over a network. In some implementations, description distribution subsystem 924 includes or interfaces with content serving system 860. For example, description distribution subsystem 924 identifies distributable job postings to content serving system 860 and content serving system 860 serves the job postings to various user accounts on a user connection network via, for example, assignments of the job postings to slots of user feeds.

Post-distribution feedback subsystem 928 includes one or more computer programs or routines that receive and track post-publication feedback 930 relating to distributed description 926. Examples of post-publication feedback 930 include social action data linked with distributed description 926, including views, likes, online job applications and subsequent actions, such as job offer notifications and hiring announcements. In some implementations, the execution of post-distribution feedback subsystem 928 is initiated by an API call from description generation system 840 or application software system 830.

In some implementations, post-distribution feedback subsystem 928 returns post-publication feedback 930 to one or more of description generation subsystem 914 or prompt generation subsystem 910. For example, post-publication feedback 930 is used by prompt generation subsystem 910 to select a subsequent prompt template or to modify an existing prompt template.

As another example, post-publication feedback 930 is joined with the prompt 912 used to generate the machine-generated content of the distributed description 926 to create training data for the generative language model of description generation subsystem 914, and the generative language model is trained or fine-tuned using the training data. As an additional example, post-publication feedback 930 includes social action data that is used to train one or more scoring models and/or classification models of, e.g., a filtering mechanism of pre-distribution feedback subsystem 918.

The examples shown in FIG. 9 and the accompanying description, above are provided for illustration purposes. This disclosure is not limited to the described examples.

Figure 10:
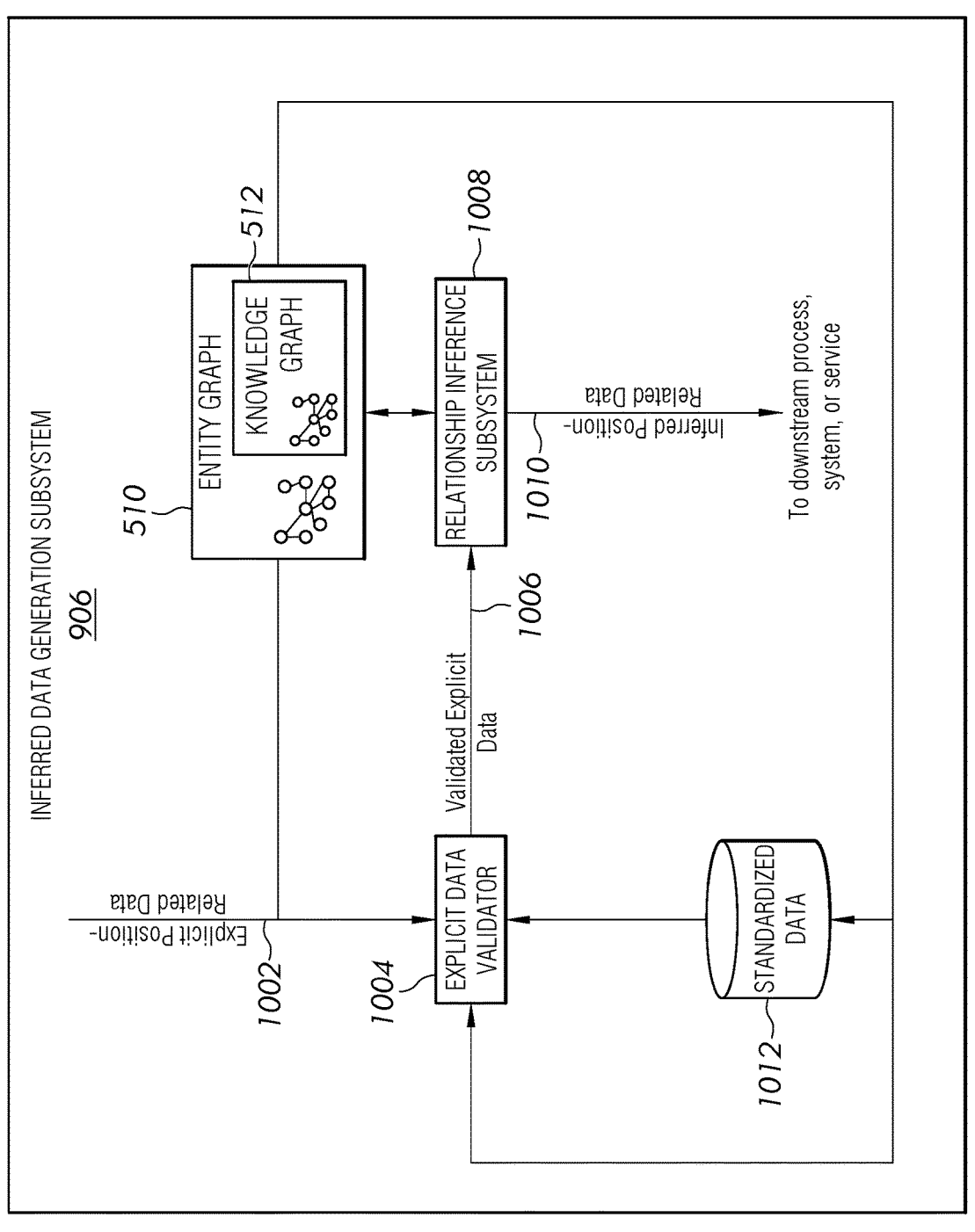
FIG. 10 is a flow diagram of an example method for automated inferred data generation using components of an inferred data generation subsystem in accordance with some embodiments of the present disclosure.

FIG. 10 is a flow diagram of an example method for automated inferred data generation using components of an inferred data generation subsystem in accordance with some embodiments of the present disclosure.

The method 1000 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by components of description generation system 840 of FIG. 8, such as inferred data generation subsystem 906 shown in FIG. 9, described above. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 10, inferred data generation subsystem 906 includes an explicit data validator 1004, a relationship inference subsystem 1008, and a data store that stores standardized data 1012. The explicit data validator 1004 includes one or more computer programs or routines that validate explicit position-related data values such as position-related data received via an online form, e.g., via user interface 100. In some implementations, the execution of explicit data validator 1004 is initiated by an API call from inferred data generation subsystem 906, description generation system 840 or application software system 830.

The explicit data validator 1004 receives explicit position-related data 1002 from, e.g., a user interface such as user interface 100. Examples of explicit position-related data include job title and company name. To validate the explicit position-related data 1002, explicit data validator 1004 queries standardized data 1012 for standardized data that matches the explicit position-related data 1002. As described above, match as used herein may refer to an exact match or an approximate match based on textual or semantic similarity. For example, if the explicit position-related data 1002 contains the data value, software programmer, explicit data validator 1004 searches standardized data 1012 using "software programmer" as a search term.

In response to finding a value in standardized data 1012 that matches the explicit position-related data 1002, explicit data validator 1004 sends the validated explicit data 1006 to relationship inference subsystem 1008. In response to not finding a value in standardized data 1012 that matches the explicit position-related data 1002, explicit data validator 1004 requests the user to input, e.g., via user interface 100, another explicit data value. Alternatively or in addition, explicit data validator 1004 presents, e.g., via user interface 100, a list of valid, standardized data values that most closely match the input explicit position-related data 1002 from which the user can select, e.g., via user interface 100, a valid standardized data value from the list to be used as validated explicit data 1006.

Standardized data 1012 includes, in some implementations, a taxonomy or ontology of standardized data values. For example, standardized data 1012 can include a hierarchical taxonomy of job titles, skill keywords, and roles or positions, in which generalized data values are at the top of the hierarchy and more specific data values are lower in the hierarchy, e.g., software engineer is at a higher level in the hierarchical taxonomy than senior software engineer because senior software engineer relates to a more specific role than software engineer.

Standardized data 1012 includes standardized data values that have been curated, e.g., by engineers and/or automated processes, based on data contained in entity graph 510 or knowledge graph 512. As such, standardized data 1012 is dynamic in the sense that as entity graph 510 and/or knowledge graph 512 are updated to include new entities, attributes, or network activity, e.g., based on user interactions within jobs platform 834 and/or user connection network 832, standardized data 1012 is correspondingly updated to include new standardized data values. For example, if a job title such as "generative language model prompt engineer" begins to appear in job postings on jobs platform 834, that job title or a standardized version of the job title is created and stored in standardized data 1012.

In another example, explicit data validator 1004 validates portions of explicit position-related data 1002 by searching or traversing entity graph 510 or knowledge graph 512. For example, in response to receiving a company name, e.g., via user interface 100, as explicit position-related data 1002, explicit data validator 1004 searches entity graph 510 or knowledge graph 512 for an entity profile (e.g., which corresponds to a company profile page in user connection network 832) that matches the input company name.

In response to finding, in the entity graph 510, 512, an entity profile that matches the input company name, explicit data validator 1004 sends the company name to relationship inference subsystem 1008 as validated explicit data 1006. In response to not finding, in the entity graph 510, 512, an entity profile that matches the input company name, explicit data validator 1004 requests the user to input, e.g., via user interface 100, another company name. Alternatively or in addition, explicit data validator 1004 presents, e.g., via user interface 100, a list of valid, standardized data values for company names that most closely match the input explicit position-related data 1002 from which the user can select, e.g., via user interface 100, a valid standardized data value from the list to be used as the company name in validated explicit data 1006.

Relationship inference subsystem 1008 includes one or more computer programs or routines that receive validated explicit data 1006 and use the received validated explicit data 1006 to generate inferred position-related data 1010. In some implementations, the execution of relationship inference subsystem 1008 is initiated by an API call from inferred data generation subsystem 906, description generation system 840, or application software system 830.

Because validated explicit data 1006 has been validated, e.g., contains standardized, structured, or otherwise validated data values, the inferred position-related data 1010 output by relationship inference subsystem 1008 is based on validated data. To generate inferred position-related data 1010, relationship inference subsystem 1008 interfaces directly with entity graph 510 or knowledge graph 512 or via, for example, one or more machine learning-based classification models, scoring models, or graph neural networks. For instance, relationship inference subsystem 1008 generates inferred links and uses those generated inferred links to identify inferred data that is related (e.g., statistically correlated) with validated explicit data 1006 using the approaches described above with reference to FIG. 5, FIG. 6, and/or FIG. 7.

Examples of inferred position-related data 1010 and processes that can be used by relationship inference subsystem 1008 to generate the inferred data include the following: a set of suggested users that have one or more skills listed in their user profiles in the user connection network 832 that match one or more skills linked by a graph 510, 512 with a job title input into the description generation system as explicit data by a job posting user; a company description that is curated or generated, e.g., by a generative language model, based on mentions of the associated company name retrieved by a query of documents and/or comments on the user connection network 832 and/or existing job postings in the jobs platform 834; a suggested job title determined based on historical job posting data for a particular company in the jobs platform 834, e.g., a particular company uses a particular job title to refer to a particular role; statistical correlations between certain job titles and user interactions with certain job postings that contain those job titles are used to determine skill keywords correlated with those job titles; statistical correlations between industry data and skill keywords, e.g., historical data about the skill keywords that are linked with previous hires for a particular role or job title across an industry; information extraction techniques such as named entity recognition are used to extract skill keywords from unstructured data contained within entity profiles, e.g., given a textual description of an entity, such as a user's history of work experience or projects, the textual description is input to a named entity recognition program to extract skill keywords; inferences that are determined based on historical network activity data such as user connections, likes, follows of other uses with certain skill sets, endorsements of other uses, announcements of promotions, awards, or successful exam outcomes extracted from user profiles in the user connection network 832, n-degree Connections of the posting user whose user profiles contain a standardized job title that matches the validated explicit data 1006, users in the user connection network 832 who are outside the posting user's connection network (e.g., not connected to the posting user at all or n>1), but whose user profiles contain a job title that matches the validated explicit data 1006, etc. The inferred position-related data 1010 is data that is derived from entity graph 510 or knowledge graph 512, e.g., based on statistical analysis, as opposed to explicitly stated in the entity graph 510 or knowledge graph 512. The inferred position-related data 1010 includes data that is identified as a result of statistical correlations between structured entities, e.g., standardized data entities.

In some implementations, the approaches used by relationship inference subsystem 1008 to generate inferred position-related data 1010 include an automatic downranking for frequently-occurring skill keywords. For example, certain soft skills such as leadership and teamwork are automatically downranked because they are less likely to be unique to a particular job title but rather are often applicable to many different job titles across many different industries. By the same token, in some implementations, relationship inference subsystem 1008 automatically up ranks infrequently-occurring skill keywords that may likely be valuable to have in a new hire for a particular role or position. For example, skill keywords that are distinctive to a particular job title, such as C++ for software engineer, are automatically upranked so that they are more likely to be included in the set of inferred data output by relationship inference subsystem 1008 as inferred position-related data 1010.

The relationship inference subsystem 1008 outputs the inferred position-related data 1010 for use by one or more downstream processes, systems, or services, such as prompt generation subsystem 910. For example, relationship inference subsystem 1008 outputs data pairs or data sets, e.g., a pair or set of associated data values such as validated explicit data 1006 and the associated inferred position-related data 1010 produced by relationship inference subsystem 1008 based on the validated explicit data 1006, in some implementations.

The examples shown in FIG. 10 and the accompanying description, above are provided for illustration purposes. This disclosure is not limited to the described examples.

Figure 11:
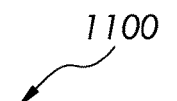
FIG. 11 is a flow diagram of an example method for automated prompt generation using components of a prompt generation subsystem in accordance with some embodiments of the present disclosure.
Figure 12:
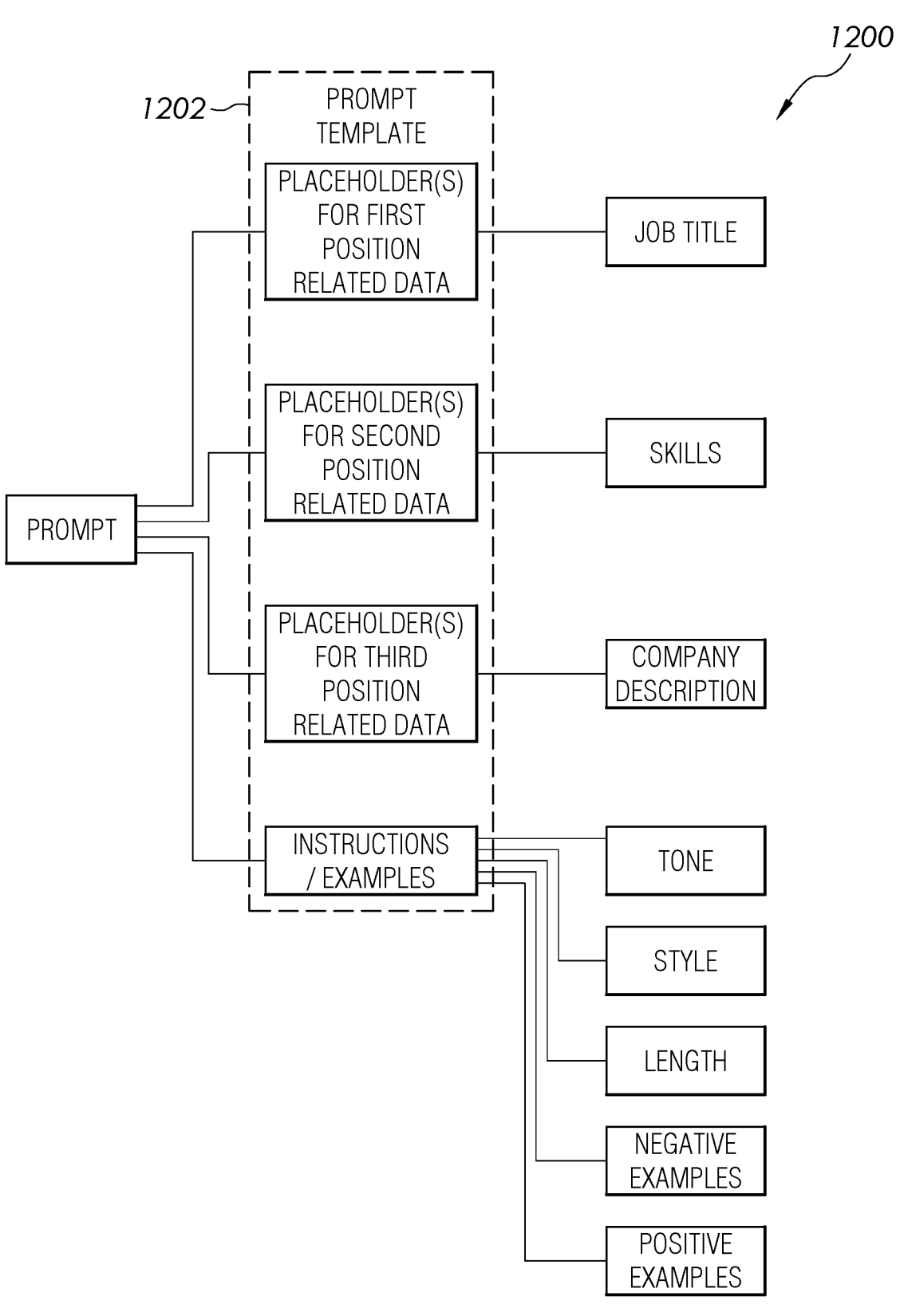
FIG. 12 is a graphical representation of an example of components of a prompt in accordance with some embodiments of the present disclosure.

FIG. 11 is a flow diagram of an example method for automated prompt generation using components of a prompt generation subsystem in accordance with some embodiments of the present disclosure.

The method 1100 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by one or more components of description generation system 840 of FIG. 8, such as prompt generation subsystem 910 shown in FIG. 9, described above. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 11, prompt generation subsystem 910 includes one or more computer programs or routines that generate prompts that are configured to cause a generative language model to machine-generate and output a position-related description such as a job description or a company description. In some implementations, the execution of prompt generation subsystem 910 is initiated by an API call from description generation system 840 or application software system 830.

In the example of FIG. 11, prompt generation subsystem 910 includes an inferred data generator 1104, a prompt template selector 1108, a prompt generator 1112, a feedback processor 1116, and a prompt tuner 1120. Inferred data generator 1104 uses at least a portion of entity graph 152 and/or knowledge graph 156 to generate position-related data 1106. Examples of entity graphs at least a portion of which can be used by inferred data generator 1104 are shown in FIG. 5 and FIG. 6, described above.

Inferred data generator 1104 receives as inputs explicit position-related data 1102 and entity graph 510 or knowledge graph 512. Based on the received explicit position-related data 1102 and entity graph 510 or knowledge graph 512, inferred data generator 1104 generates position-related data 1106. In some implementations, inferred data generator 1104 is a version of inferred data generation subsystem 906 that is implemented as a component of prompt generation subsystem 910 instead of as a separate component of the description generation system.

To generate position-related data 1106, inferred data generator 1104 traverses entity graph 510 or knowledge graph 512 using one or more queries configured to search the graph 510, 512 for data that matches or is statistically correlated the explicit position-related data 1102. In some approaches, inferred data generator 1104 retrieves data from graph 510, 512. Inferred data generator 1104 pairs or combines the retrieved data with the explicit position-related data 1102, and uses the paired or combined data, e.g., a combination of data retrieved from graph 510, 512 and the explicit position-related data 1102, as input to one or more machine learning-based models, such as classification models, scoring models, or graph neural networks. In those cases, inferred data generator 1104 uses the model output to generate the position-related data 1106. Inferred data generator 1104 outputs position-related data 1106, e.g., a combination of explicit position-related data 1102 and inferred data generated by inferred data generator 1104 based on the explicit position-related data 1102, to prompt generator 1112 and prompt template selector 1108. Additional examples of technologies that can be used to implement inferred data generator 1104 are shown in FIG. 5, FIG. 6, FIG. 7, FIG. 9, and FIG. 10, described above.

Prompt template selector 1108 selects a prompt template 1110 from prompt data store 885 based on one or more of position-related data 1106 and scores 1122. Prompt templates stored in prompt data store 885 can include initial templates and engineered templates. An initial template includes a template that is created manually, or in a semi-automated or automated way by, for example, prompt engineers or users of the online system, without any system-generated feedback. An engineered template includes an initial template that has been created or modified, either manually or in a semi-automated or automated way, based on feedback such as prompt feedback 1118. Initial templates and engineered templates are stored in prompt data store 885. The prompt templates stored in prompt data store 885 are indexed by a unique prompt template identifier and one or more keywords, in some implementations.

In some implementations, prompt template selector 1108 randomly selects an initial prompt template 1110 from a set of stored prompt templates. Prompt template selector 1108 uses random selection, for example, on an initial iteration of a generative language model, in cases where no engineered prompts are available, or in cases where all of the prompt templates in the set of stored prompt templates have the same template scores 1122 (e.g., at initialization). When template scores 1122 are available, prompt template selector 1108 ranks the set of stored prompt templates based on the template scores 1122 and selects the highest-ranking prompt template, in some implementations.

Position-related data 1106 and selected template 1110 are inputs to prompt generator 1112. Prompt generator 1112 generates and outputs generated prompt 1114 based on position-related data 1106 and selected template 1110. Prompt generator 1112 generates a different prompt 1114 for each set of position-related data 1106. Prompt generator 1112 can use a different template or the same template for different sets of position-related data 1106. Prompt generator 1112 includes the identifier of the position-related data 1106 used to create the prompt 1114 and the prompt template identifier of the prompt template 1110 used to create the prompt 1114, or references to the respective identifier of the position-related data 1106 and prompt identifier, in the generated prompt 1114, in some implementations. Prompt generator 1112 assigns a unique prompt identifier to each prompt 1114. The prompt identifier can include, for example, the identifier for a given set of position-related data 1106 and the prompt template identifier for a given prompt template 1110.

In some implementations, the generated prompt 1114 is processed by feedback processor 1116 to generate prompt feedback 1118. Feedback processor 1116 obtains feedback related to generated prompt 1114. Examples of feedback that can be obtained by feedback processor 1116 include pre-publication feedback 530 and/or post-publication feedback 532, described above.

Feedback processor 1116 formulates prompt feedback 1118 based on, for example, various combinations of pre-publication feedback 530 and/or post-publication feedback 532. An example of prompt feedback is a score, a label, or a rating, where the score, label or rating is applied to a prompt pair by a scoring model, a classification model, or a human reviewer. As an example, if a generative language model uses a generated prompt 1114 to machine-generate a job posting that a filter mechanism classifies as containing inappropriate or irrelevant content, the inappropriate or irrelevant content label can be returned by the filter mechanism to feedback processor 1116. In some implementations, feedback processor 1116 uses the prompt template identifier to map the content label to the corresponding prompt template 1110 that generated the inappropriate or irrelevant content-producing prompt, and sends the labeled prompt to prompt tuner 1120 as prompt feedback 1118.

Prompt tuner 1120 uses prompt feedback 1118 to generate template scores 1122 for prompt templates stored in prompt data store 885. To compute template scores 1122, prompt tuner 1120 computes a measure of similarity or relevance between each available prompt template and a set of position-related data, e.g., job titles. In other words, prompt templates can be scored and ranked based on similarity or relevance to particular job titles, such that prompt data store 885 can store and maintain prompt templates that are customized by job title or other position-related data, such as company name. Thus, each prompt template can have a set of template scores 1122, where each set of template scores is specific to a particular set of position-related data. For instance, the same prompt template could have a template score of 100 for the job title of "software engineering" and a template score of 10 for the job title of "short order cook," where a higher score indicates higher relevance.

In some implementations, the template scores 1122 are initialized to the same value for all of the prompt templates in the prompt data store 885 and then the template scores 1122 are recomputed by prompt tuner 1120 for individual prompt templates when prompt feedback 1118 is received for those templates. For example, the template score for a particular prompt template may decrease after prompt tuner 1120 receives prompt feedback 1118 that indicates that the prompt template produced a machine-generated job description that was classified as containing inappropriate or irrelevant content by a filter mechanism.

Prompt generation subsystem 910 outputs a prompt 1114, where the prompt is based on the position-related data 1106, and the position-related data includes inferred data generated by inferred data generator 1104. For example, the prompt 1114 is created by prompt generation subsystem 910 merging position-related data 1106 with a selected prompt template 1110, e.g., by populating placeholders or parameters in the selected prompt template 1110 with corresponding elements of position-related data 1106. Prompt generation subsystem 910 sends the prompt output 1114 to a downstream component, process, system or service, such as a generative language model or description generation subsystem. Additional description and examples of prompts configured for description generation by a generative language model are shown in FIG. 12 and Table 1, described below.

The examples shown in FIG. 11 and the accompanying description, above are provided for illustration purposes. This disclosure is not limited to the described examples.

FIG. 12 is a graphical representation of an example of components of a prompt in accordance with some embodiments of the present disclosure.

In the example of FIG. 12, a prompt is structured according to a prompt template 1202. The prompt template 1202 includes one or more placeholders for first position-related data, one or more placeholders for second position-related data, one or more placeholders for third position-related data, and instructions and/or examples. At least some of the first, second, or third position-related data is explicit position-related data and at least some of the first, second, or third position-related data is inferred position-related data. Each of the sets of placeholders in the prompt template 1202 are associated with a different category or type of position-related data. For instance, in FIG. 12, the placeholder(s) for first position-related data are placeholders for one or more job titles, e.g., explicit data; the placeholder(s) for second position-related data are placeholders for one or more skill keywords, e.g., inferred data, and the placeholder(s) for third position-related data are placeholders for one or more company descriptions, e.g., explicit or inferred data. In some implementations, when the prompt template 1202 is applied to a set of position-related data, the respective position-related data is mapped to, merged with, or inserted into the respective placeholder. For example, the job title is mapped to, merged with, inserted into the placeholder for first position-related data, skill keywords are mapped to, merged with, or inserted into the placeholders for second position-related data, and the company description is mapped to, merged with, or inserted into the third position-related data.

In some implementations, the prompt includes a prefix. A prefix is a parameter that can be filled with context data, such as data that includes previous output produced by a generative language model. The previous output can include, for instance, a job posting that was previously generated by the generative language model and edited by the posting user via, e.g., user interface 400.

In some implementations, instructions and/or examples are included in a portion of the prompt template known as a suffix. The suffix is a parameter that can be filled with data that describes one or more instructions and or examples related to the current task for the generative language model. For instance, instructions and/or examples can indicate that the output of the generative language model should be a piece of writing that is written in a particular tone or style, e.g., enthusiastic, motivational, etc., or that the output instructions for the generative model (e.g., write a job description) or examples of the kind of output the generative language model is to produce (e.g., an example of a previously-drafted job description), and [model parameters] are placeholders for required or optional parameter values used by the generative language model to generate output (e.g., output length, tone, style). Table 1 below shows an example of a prompt template configured to cause a generative language model to machine-generate a job description for, e.g., an online job posting.

TABLE 1

Example of a Prompt Template for a Description.

P0: "Write a job description for [title(1)] title at [company(2)] company. State the role is [role(3)], [role(4)], and located in [location(5)]. Include this company description: [company_descr(6)], role description, required skills, preferred skills, and benefits section. Add [skill_keywords(7)] skills, and [skill_keywords(8)] skills. In the benefits section, write "we recommend you list benefits to improve candidate engagement." Do not include [skill_keywords(9)] skills. Write in a [tone(10)] tone. Do not reference benefits or salary. Make the description >M and <MM words."

should be of a certain length, e.g., a length suitable for a job posting, such as a minimum length in the range of about 100 words and a maximum length in the range of about 600 words.

In some implementations, the instructions and/or examples include negative examples and/or positive examples. Negative examples are examples of data values that the generative language model should not use to generate the output or include in the machine-generated output. A negative example is, for instance, a skill keyword that does not match or statistically correlate with the job title or a job title that does not match or statistically correlated with a skill keyword. For example, if WINDOWS (meaning the computer operating system) is a skill keyword, the generative language model should not generate a job description for a window washer or automobile window repair specialist.

Positive examples are examples of data values that the generative language model should use to generate the output or include in the machine-generated output. A positive example is, for instance, a skill keyword that does match or statistically correlate with the job title, or a job title that does match or statistically correlate with a skill keyword. For example, if WINDOWS (meaning the computer operating system) is a skill keyword, the generative language model should generate a job description for a software engineer.

The examples shown in FIG. 12 and the accompanying description, above are provided for illustration purposes. This disclosure is not limited to the described examples. For example, prompt templates that do not include a prefix or do not include a suffix can be used, in other implementations. Also, in other implementations, context data can be included in other sections of a prompt and need not be limited to the prefix. Similarly, instructions and examples can be included in other sections of a prompt and need not be limited to the suffix.

A prompt template includes a format and/or specification for arranging data and/or instructions for input a generative language model so that the generative language model can read and process the inputs and machine-generate corresponding output. An example of a format for a prompt template is: [data placeholder] [instructions or examples] [model parameters], where [data placeholder] is a placeholder for an input (e.g., explicit or inferred position-related data), [instructions or examples] are placeholders for As shown in Table 1, the example prompt template P0 contains specific instructions on how the generative language model is to generate and output a job description, e.g., write a job description, state this, include this, add this, write this, do not include that, etc. Additionally, the example prompt template P0 contains requirements that pertain to the structure of the output, e.g., instructions for how the generative language model is to structure the output, e.g., company description followed by role description followed by required skills followed by preferred skills followed by benefits section.

The example prompt template P0 uses parameters such as M, MM, to signify data values that can be set according to the requirements of a particular design or implementation of the description generation system. For example, the values of M and MM may be different for different types of job descriptions. For instance, the values of M and MM may be smaller for entry-level job positions and larger for executive-level positions.

In the example prompt template P0, brackets denote parameters that can be filled in or replaced with specific data values, e.g., at runtime. The parameters are numbered in a numerical order that corresponds to the order in which the corresponding data values appear in the position-related data that is passed to the prompt generator. For example, an instance of position-related data that could be merged with or mapped to the prompt template P0 to cause a generative language model to generate a job description for a software engineering position is as follows: ["software engineer"; Microsoft; full-time; remote; "United States"; "Microsoft is a leading provider of computer software, cloud computing services, video games, computer and gaming hardware, search and other online services."; "data science"; "machine learning"; COBOL; collegial; 100, 500]. In the example instance of position related data, "software engineer" maps to the title(1) placeholder, Microsoft maps to the company (2) placeholder, full-time maps to the role(3) placeholder, remote maps to the role(4) placeholder, "United States" maps to the location(5) placeholder, "Microsoft is a leading provider of computer software, cloud computing services, video games, computer and gaming hardware, search and other online services." maps to the company_descr(6) placeholder, "data science" maps to the skill_keywords(7) placeholder, "machine learning" maps to the skill_keywords(8) placeholder, COBOL maps to the skill_keywords(9) placeholder, collegial maps to the tone(10) placeholder, 100 maps to parameter M, and 500 maps to parameter MM.

As shown in Table 1, example prompt template P0 includes positive examples, such as skill keywords(7) and skill_keywords(8), and negative examples, such as skill_keywords(9) and the instruction "do not reference benefits or salary."

Additional description of prompt templates and prompts are described in more detail above with reference to FIG. 11. The examples shown in FIG. 12 and Table 1, and the accompanying description, above, are provided for illustration purposes. This disclosure is not limited to the described examples.

Figure 13:
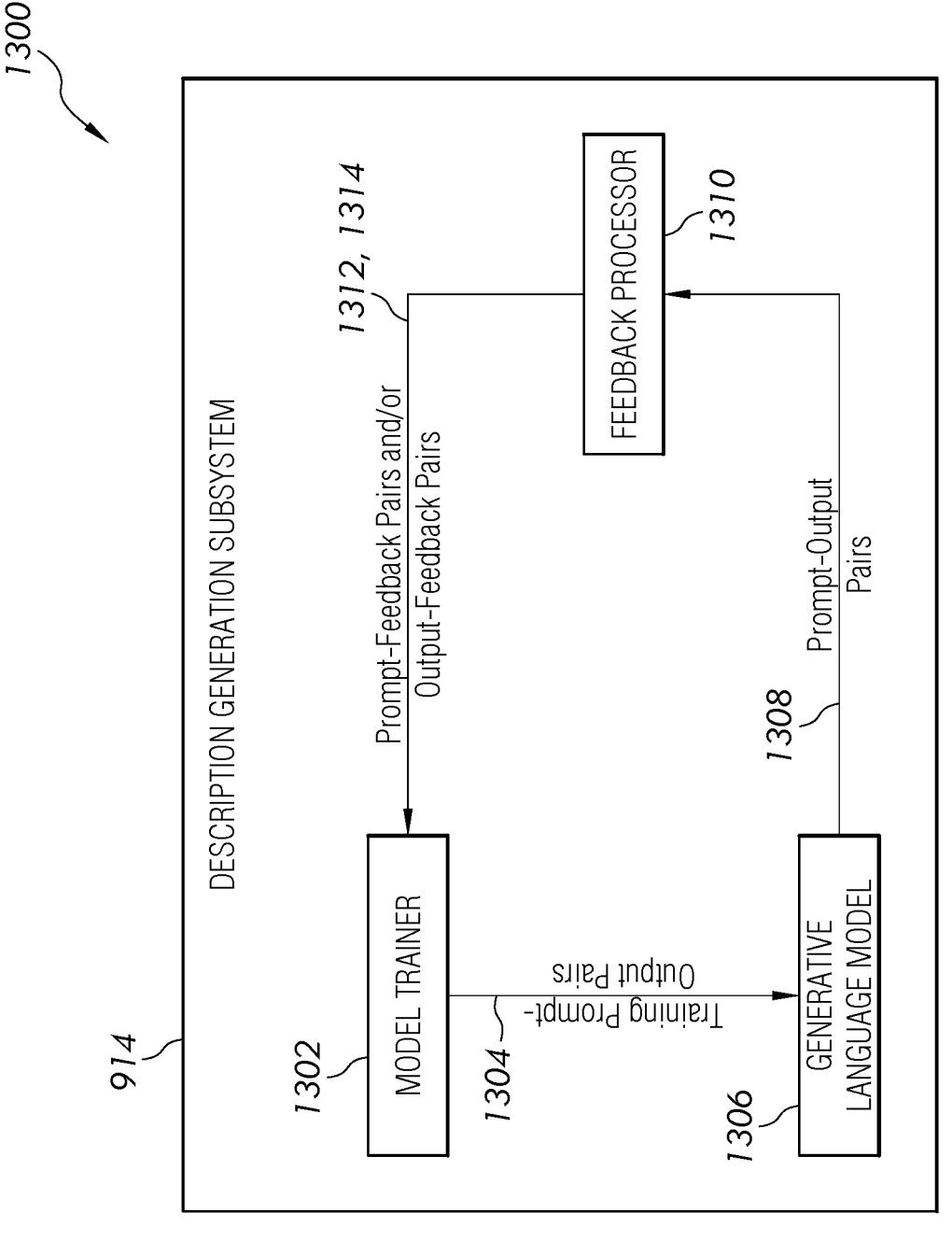
FIG. 13 is a flow diagram of an example method for automated description generation using components of a description generation subsystem in accordance with some embodiments of the present disclosure.

FIG. 13 is a flow diagram of an example method for automated description generation using components of a description generation subsystem in accordance with some embodiments of the present disclosure.

The method 1300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1300 is performed by one or more components of description generation system 840 of FIG. 8, such as description generation subsystem 914, shown in FIG. 9, described above. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 13, description generation subsystem 914 includes one or more computer programs or routines that train or fine tune a generative language model 1306 for description generation tasks, e.g., to configure the generative language model 1306 to machine-generate and output job descriptions. In some implementations, the execution of description generation subsystem 914 or more specifically the generative language model 1306 is initiated by an API call from description generation system 840 or application software system 830.

In the example of FIG. 13, description generation subsystem 914 includes a model trainer 1302, a generative language model 1306, and a feedback processor 1310 operatively coupled together in a closed loop. Model trainer 1302 receives feedback data from a previous iteration of generative language model 1306. The feedback data is generated by feedback processor 1310 in response to the output of the previous iteration of the generative language model. The feedback data generated by feedback processor 1310 includes prompt-feedback pairs 1312 and/or output-feedback pairs 1314.

To create a prompt-feedback pair 1312, in some implementations, feedback processor 1310 computes a score, such as a reward score, based on feedback related to a particular prompt. Feedback related to a particular prompt can include feedback directly related to the prompt, such as a rating, a score, or label that is assigned to the prompt by a human reviewer or an automated process, such as a scoring model or a classification model of a feedback subsystem. The feedback related to a particular prompt also or alternatively can include feedback related to output produced by the generative language model 1306 based on the prompt. For instance, given a prompt-output pair 1308, feedback processor 1310 computes a score for the prompt-output pair 1308 by applying a reinforcement learning model to the feedback associated with the prompt-output pair.

To create an output-feedback pair 1314, in some implementations, feedback processor 1310 computes a score, such as a reward score, based on feedback related to a particular output of the generative language model 1306. Feedback related to a particular output can include feedback directly related to the output, such as a rating, a score, or label that is assigned to the output by a human reviewer or an automated process, such as a scoring model or a classification model of a feedback subsystem. The feedback related to a particular output also or alternatively can include feedback related to the prompt that was used by the generative language model 1306 to create the output. For instance, given a prompt-output pair 1308, feedback processor 1310 computes a score for the prompt-output pair by applying a reinforcement learning model to the feedback associated with the prompt-output pair.

In some implementations, the generative language model 1306 is pre-trained on a large corpus (e.g., millions of training examples) and can be re-trained or fine-tuned for particular applications or domains. Model trainer 1302 creates training data based on the prompt-feedback pairs 1312 and/or output-feedback pairs 1314 received from feedback processor 1310. The training data created by model trainer 1302, e.g., training prompt-output pairs 1304, is used to train or fine tune the generative language model 1306 using, for example, supervised machine learning or semi-supervised machine learning. An instance of training data includes ground-truth data for a given prompt-output pair, where the ground-truth data includes, for example, a reward score, a classification, or a label generated by feedback processor 1310 in communication with one or more feedback subsystems such as pre-distribution feedback subsystem 918 or post-distribution feedback subsystem 928. In a training or fine tuning mode, the generative language model 1306 is applied to the training prompt-output pairs 1304 and one or more model parameters of the generative language model 1306 are updated based on the training or fine tuning. Alternatively or in addition, the architecture of the generative language model 1306 can be re-engineered based on new instances of training data or based on a new application or domain. In an operational mode, the generative language model 1306 generates output in response to prompts. The prompt-output pairs 1308 generated by the generative language model 1306 are processed by feedback processor 1310 to create prompt-feedback pairs 1312 and/or output-feedback pairs 1314 when the feedback processor 1310 receives feedback related to the respective prompt-output pairs 1308.

In some implementations, feedback processor 1310 includes a reinforcement learning component such as a reinforcement learning model that machine-learns a reward function based on feedback associated with prompt-output pairs. For example, given a prompt-output pair 1308, feedback processor 1310 receives or identifies feedback that pertains to the prompt-output pair 1308. The feedback can include pre-distribution feedback and/or post-distribution feedback received from one or more other components of the description generation system. The feedback processor 1310 applies the reward function to the received or identified feedback to generate a reward score for the corresponding prompt-output pair based on the feedback associated with the prompt-output pair. The reward scores are incorporated into the prompt-feedback pairs 1312 and/or output-feedback pairs 1314, which are then used to train or fine tune the generative language model 1306 using, for example, supervised or semi-supervised machine learning. The examples shown in FIG. 13 and the accompanying description, above are provided for illustration purposes. This disclosure is not limited to the described examples.

FIG. 14 is a flow diagram of an example method for automated description generation in accordance with some embodiments of the present disclosure.

The method 1400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1800 is performed by one or more components of description generation system 840 of FIG. 2. For example, in some implementations, portions of the method 1800 are performed by one or more components of a description generation system shown in FIG. 5 and/or FIG. 9, described above. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In some implementations, processing device executing the method 1400 receives an explicit piece of position-related data (e.g., job title), and from the explicit data, infers other relevant pieces of position-related data and, based on the explicit and inferred data, auto-generate a job description using a generative language model. In some implementations, a user connection network and/or an entity graph or knowledge graph is leveraged to validate the data that is used to generate the job description.

At operation 1402, the processing device receives, via a user interface, an input associated with a first user of a user connection network, where the input identifies first position data related to a position capable of being filled by a hiring of a person. In some implementations, operation 1402 is performed via user interface 100 shown in FIG. 1, described above, or a similar input mechanism. In some implementations, an inferred data generator such as shown in FIG. 5, FIG. 9 or FIG. 10, described above, receives the input.

At operation 1404, the processing device, in response to validating the first position data, extracts, from the user connection network, based on the first position data, second position data different from the first position data. In some implementations, operation 1404 is performed via an inferred data generator such as inferred data generator 514 shown in FIG. 5 and/or inferred data generation subsystem 906 shown in FIG. 9 and FIG. 10, described above, using a user connection network such as user connection network 832 shown in FIG. 8, described above and/or an entity graph or knowledge graph, such as graphs 510, 512 shown and described in connection with FIG. 5, FIG. 6, and FIG. 7, described above.

In some implementations, the first position data is validated using, e.g., a taxonomy, e.g., to make sure that the first position data contains standardized data, and the validated first position data is used to determine the second position data. In some implementations, the first position data includes at least one of a job title or a company description, and the second position data includes at least one skill keyword. In some implementations, the first position data is validated by searching at least one data store for a standardized job title that matches the first position data; retrieving, from the at least one data store, the standardized job title that matches the first position data; and replacing the first position data with the standardized job title.

In some implementations, the position description is only generated if there are no position templates available. For example, operation 1404 can include searching at least one data store associated with the user connection network for a position template associated with the first user and the first position data; and generating and sending the position description to the user interface in response to not finding the position template in the searched at least one data store.

In some implementations, operation 1404 includes extracting third position data from a first user profile associated with the first user of the user connection network, where the third position data is different from the first position data and the second position data. For example, the third position data can include a company name or company description associated with the company that currently employs the first user. In some implementations, operation 1404 includes validating the third position data by extracting a company name from the first user profile; searching at least one data store associated with the user connection network for a company profile associated with the extracted company name; and finding, in the at least one data store associated with the user connection network, the company profile associated with the company name.

In some implementations, the user connection network and/or a connection graph, e.g., entity graph 510 and/or knowledge graph 512, are dynamically updated in response to user interactions with the user connection network, and at least some of the position data used to machine-generate the position description via the generative language model is extracted or updated dynamically based on the dynamic updates to the user connection network and/or connection graph. For example, a connection graph associated with the user connection network is updated in response to a user interaction with the user connection network, and the second position data is extracted from the updated connection graph, in some implementations.

At operation 1406, the processing device formulates a first prompt based on the first position data and the second position data. The first prompt is configured to cause a generative language model to generate and output a description, such as a job description, based on the first prompt, where the first prompt is based on the first and second position data, and the first and second position data include a combination of explicit position data and inferred position data. In some implementations, operation 1406 is performed by portions of prompt generator 518 shown in FIG. 5, described above, and/or prompt generation subsystem 910 shown in FIG. 9 and FIG. 11, described above. Examples of prompts are shown and described above with reference to FIG. 12 and Table 1.

In some implementations, the user connection network is used to identify user profiles from which to extract position data for a prompt. For example, in some implementations, skills associated with a user profile of an "ideal job candidate" on the user connection network is used to refine the prompt, e.g., to create a second version of the prompt, where the ideal candidate is identified based on a matching of a portion of the user profile with a portion of the first position data. In some implementations, operation 1406 includes searching the user connection network for user profiles that match the first position data; retrieving, from the user connection network, at least one user profile that matches, based on a comparison of a measure of textual similarity to a threshold level of similarity, the first position data; receiving a selection of a user profile of the retrieved at least one user profile that matches the first position data; extracting, from the selected user profile, additional second position data different from the second position data; formulating a second prompt different from the first prompt based on the additional second position data; sending the second prompt to the generative language model; receiving, from the generative language model, a second piece of writing, wherein the second piece of writing comprises a second position description output by the generative language model based on the second prompt; and sending, to the user interface, an instruction to replace the first piece of writing with the second piece of writing. In some implementations, operation 1406 includes sending the retrieved at least one user profile to the user interface; and receiving the selected user profile from the user interface.

In some implementations, information from the user profile of an identified "ideal candidate" on the user connection network is included in the first prompt. For example, operation 1406 can include searching the user connection network for user profiles that match the first position data; retrieving, from the user connection network, at least one user profile that matches the first position data; receiving a selection of a user profile of the retrieved at least one user profile that matches the first position data; extracting, from the selected user profile, additional second position data different from the second position data; and formulating the first prompt based on the additional second position data.

In some implementations, portions of the second position data used to formulate a prompt are derived from statistical correlations between user interactions with job postings on a jobs platform and data contained in the users' profiles in the user connection network. For example, operation 1406 can include generating statistical correlations between skill keywords listed in profiles associated with user interactions with job postings via the user connection network and skill keywords listed in the job postings; identifying at least one skill keyword based on the statistical correlations; and formulating the first prompt based on the at least one skill keyword identified based on the statistical correlations.

In some implementations, output of a machine learning-based classifier is used to formulate a prompt. For example, operation 1406 can include sending the first position data to a trained machine learning-based classifier; receiving the second position data from the trained machine learning-based classifier; and formulating the first prompt based on the second position data received from the trained machine learning-based classifier.

In some implementations, output of a graph neural network is used to formulate a prompt. For example, operation 1406 can include sending the first position data to a graph neural network; and receiving the second position data from the graph neural network.

In some implementations, output of a generative language is used to formulate a prompt based on position data. For instance, the generative language model can be used to revise or summarize some of the position data, e.g., a company description. For example, operation 1406 can include sending a first version of at least one of the first position data or the second position data to the generative language model; receiving, from the generative language model, a second version of the at least one of the first position data or the second position data; and formulating the first prompt based on the second version of the at least one of the first position data or the second position data.

At operation 1408, the processing device sends the first prompt to a generative language model. Operation 1408 is performed by, for example, description generation subsystem 924 shown in FIG. 9, described above or by a prompt generator such as prompt generator 518 shown in FIG. 5, described above, and/or prompt generation subsystem 910 shown in FIG. 9 and FIG. 11, described above. In some implementations, operation 1408 is implemented using an API (application programming interface) specified by the generative language model.

At operation 1410, the processing device receives, from the generative language model, a first piece of writing, where the first piece of writing includes a position description output by the generative language model based on the first prompt, and the position description is related to the position. Operation 1410 is performed by, for example, generative model 522 shown in FIG. 5, described above, and/or description generation subsystem 914 shown in FIG. 9 and FIG. 13, described above. An example of a position description output by a generative language model in response to a prompt is shown in FIG. 4, described above.

At operation 1412, the processing device sends the position description to the user interface in response to the input. Operation 1412 is performed by, for example, description generation subsystem 924 shown in FIG. 9, described above in communication with, e.g., user interface 400 shown in FIG. 4, described above. In some implementations, operation 1412 is implemented via description generation system 840 using an API (application programming interface) in communication with, e.g., job posting interface 814 shown in FIG. 8, described above.

In some implementations, a filter mechanism is applied to the machine-generated description before the description is presented to a user or distributed via a network. For example, operation 1410 or operation 1412 can include applying a filter mechanism to the position description; and sending the position description to the user interface in response to output of the filter mechanism satisfying a filter criterion.

In some implementations, the posting user for whom the position description is auto-generated by the generative language model edits the machine-generated position description and the user's edits are used to generate feedback, and the feedback is used to refine the prompt and/or fine tune the generative language model. For example, in executing the method 1400, the processing device can perform operations including receiving, via the user interface, at least one edit to a first version of the first piece of writing; creating a second version of the first piece of writing based on the at least one edit; determining a difference between the first version of the first piece of writing and the second version of the first piece of writing; formulating feedback based on the difference between the first version of the first piece of writing and the second version of the first piece of writing; and based on the feedback, at least one of (i) formulating a second version of the first prompt or (ii) training the generative language model.

In some implementations, feedback on the machine-generated position description is received after the position description is distributed via a network, and the post-distribution feedback is used to refine the prompt and/or fine tune the generative language model. For example, in executing the method 1400, the processing device can perform operations including distributing the position description via the user connection network; via the user connection network, receiving feedback in response to the distribution of the position description; and based on the feedback, at least one of (i) formulating a second version of the first prompt or (ii) training the generative language model.

In some implementations, the user connection network includes a network of web pages that are accessible to and capable of being viewed by users of the user connection network via a connection graph, where the connection graph includes nodes that represent the users and edges that represent connections between the users or relationships between the users.

In some implementations, a system includes at least one processor; and at least one memory coupled to the at least one processor, where the at least one memory includes instructions that, when executed by the at least one processor, cause the at least one processor to perform at least one operation of the method 1400. In some implementations, at least one non-transitory machine-readable storage medium includes instructions that, when executed by at least one processor, cause the at least one processor to perform at least one operation of the method 1400.

The examples shown in FIG. 14 and the accompanying description, above are provided for illustration purposes. This disclosure is not limited to the described examples.

FIG. 15 is a block diagram of an example computer system including components of a description generation system in accordance with some embodiments of the present disclosure.

In FIG. 15, an example machine of a computer system 1500 is shown, within which a set of instructions for causing the machine to perform any of the methodologies discussed herein, can be executed. In some embodiments, the computer system 1500 can correspond to a component of a networked computer system (e.g., as a component of the computer system 800 of FIG. 8) that includes, is coupled to, or utilizes a machine to execute an operating system to perform operations corresponding to one or more components of the description generation system 840 of FIG. 8. For example, computer system 1500 corresponds to a portion of computing system when the computing system is executing a portion of description generation system 840.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM) or Rambus DRAM (RDRAM), etc.), a memory 1503 (e.g., flash memory, static random access memory (SRAM), etc.), an input/output system 1510, and a data storage system 1540, which communicate with each other via a bus 1530.

Processing device 1502 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1502 can also be at least one special-purpose processing device such as an application specific integrated circuit (ASIC), a field programmable gate array (FPGA), a digital signal processor (DSP), network processor, or the like. The processing device 1502 is configured to execute instructions 1512 for performing the operations and steps discussed herein.

In FIG. 15, description generation system 1550 represents portions of description generation system 840 when the computer system 1500 is executing those portions of description generation system 840. Instructions 1512 include portions of description generation system 1550 when those portions of the description generation system 1550 are being executed by processing device 1502. Thus, the description generation system 1550 is shown in dashed lines as part of instructions 1512 to illustrate that, at times, portions of the description generation system 1550 are executed by processing device 1502. For example, when at least some portion of the description generation system 1550 is embodied in instructions to cause processing device 1502 to perform the method(s) described above, some of those instructions can be read into processing device 1502 (e.g., into an internal cache or other memory) from main memory 1504 and/or data storage system 1540. However, it is not required that all of the description generation system 1550 be included in instructions 1512 at the same time and portions of the description generation system 1550 are stored in at least one other component of computer system 1500 at other times, e.g., when at least one portion of the description generation system 1550 are not being executed by processing device 1502.

The computer system 1500 further includes a network interface device 1508 to communicate over the network 1520. Network interface device 1508 provides a two-way data communication coupling to a network. For example, network interface device 1508 can be an integrated-services digital network (ISDN) card, cable modem, satellite modem, or a modem to provide a data communication connection to a corresponding type of telephone line. As another example, network interface device 1508 can be a local area network (LAN) card to provide a data communication connection to a compatible LAN. Wireless links can also be implemented. In any such implementation network interface device 1508 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 1500.

Computer system 1500 can send messages and receive data, including program code, through the network(s) and network interface device 1508. In the Internet example, a server can transmit a requested code for an application program through the Internet and network interface device

1508. The received code can be executed by processing device 1502 as it is received, and/or stored in data storage system 1540, or other non-volatile storage for later execution.

The input/output system 1510 includes an output device, such as a display, for example a liquid crystal display (LCD) or a touchscreen display, for displaying information to a computer user, or a speaker, a haptic device, or another form of output device. The input/output system 1510 can include an input device, for example, alphanumeric keys and other keys configured for communicating information and command selections to processing device 1502. An input device can, alternatively or in addition, include a cursor control, such as a mouse, a trackball, or cursor direction keys for communicating direction information and command selections to processing device 1502 and for controlling cursor movement on a display. An input device can, alternatively or in addition, include a microphone, a sensor, or an array of sensors, for communicating sensed information to processing device 1502. Sensed information can include voice commands, audio signals, geographic location information, and/or digital imagery, for example.

The data storage system 1540 includes a machine-readable storage medium 1542 (also known as a computer-readable medium) on which is stored at least one set of instructions 1544 or software embodying any of the methodologies or functions described herein. The instructions 1544 can also reside, completely or at least partially, within the main memory 1504 and/or within the processing device 1502 during execution thereof by the computer system 1500, the main memory 1504 and the processing device 1502 also constituting machine-readable storage media.

In one embodiment, the instructions 1544 include instructions to implement functionality corresponding to a description generation system (e.g., the description generation system 840 of FIG. 8).

Dashed lines are used in FIG. 15 to indicate that it is not required that the description generation system be embodied entirely in instructions 1512, 1514, and 1544 at the same time. In one example, portions of the description generation system are embodied in instructions 1544, which are read into main memory 1504 as instructions 1514, and portions of instructions 1514 are read into processing device 1502 as instructions 1512 for execution. In another example, some portions of the description generation system are embodied in instructions 1544 while other portions are embodied in instructions 1514 and still other portions are embodied in instructions 1512.

While the machine-readable storage medium 1542 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 15 and the accompanying description, above, are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 800, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples described below, or any combination of any of the examples described below, or any combination of any portions of the examples described below.

In an example 1, a method includes receiving, via a user interface, an input associated with a first user of a user connection network, where the input identifies first position data related to a position capable of being filled by a hiring of a person; in response to validating the first position data, extracting, from the user connection network, based on the first position data, second position data different from the first position data; formulating a first prompt based on the first position data and the second position data; sending the first prompt to a generative language model; receiving, from the generative language model, a first piece of writing, where the first piece of writing includes a position description output by the generative language model based on the first prompt, and the position description is related to the position; and sending the position description to the user interface in response to the input.

An example 2 includes the subject matter of example 1, where the first position data includes at least one of a job title or a company description, and the second position data includes at least one skill keyword. An example 3 includes the subject matter of example 1 or example 2, further including validating the first position data by: searching at least one data store for a standardized job title that matches the first position data; retrieving, from the at least one data store, the standardized job title that matches the first position data; and replacing the first position data with the standardized job title. An example 4 includes the subject matter of any of examples 1-3, further including searching at least one data store associated with the user connection network for a position template associated with the first user and the first position data; and generating and sending the position description to the user interface in response to not finding the position template in the searched at least one data store. An example 5 includes the subject matter of any of examples 1-4, further including: extracting third position data from a first user profile associated with the first user of the user connection network, where the third position data is different from the first position data and the second position data. An example 6 includes the subject matter of example 5, further including validating the third position data by: extracting a company name from the first user profile; searching at least one data store associated with the user connection network for a company profile associated with the extracted company name; and finding, in the at least one data store associated with the user connection network, the company profile associated with the company name. An example 7 includes the subject matter of any of examples 1-6, where a connection graph associated with the user connection network is updated in response to a user interaction with the user connection network, and the second position data is extracted from the updated connection graph. An example 8 includes the subject matter of any of examples 1-7, further including: searching the user connection network for user profiles that match the first position data; retrieving, from the user connection network, at least one user profile that matches, based on a comparison of a measure of textual similarity to a threshold level of similarity, the first position data; receiving a selection of a user profile of the retrieved at least one user profile that matches the first position data; extracting, from the selected user profile, additional second position data different from the second position data; formulating a second prompt different from the first prompt based on the additional second position data; sending the second prompt to the generative language model; receiving, from the generative language model, a second piece of writing, where the second piece of writing includes a second position description output by the generative language model based on the second prompt; and sending, to the user interface, an instruction to replace the first piece of writing with the second piece of writing. An example 9 includes the subject matter of example 8, further including: sending the retrieved at least one user profile to the user interface; and receiving the selected user profile from the user interface. An example 10 includes the subject matter of any of examples 1-9, further including: searching the user connection network for user profiles that match the first position data; retrieving, from the user connection network, at least one user profile that matches the first position data; receiving a selection of a user profile of the retrieved at least one user profile that matches the first position data; extracting, from the selected user profile, additional second position data different from the second position data; and formulating the first prompt based on the additional second position data. An example 11 includes the subject matter of any of examples 1-10, further including: generating statistical correlations between skill keywords listed in profiles associated with user interactions with job postings via the user connection network and skill keywords listed in the job postings; identifying at least one skill keyword based on the statistical correlations; and formulating the first prompt based on the at least one skill keyword identified based on the statistical correlations. An example 12 includes the subject matter of any of examples 1-11, further including: sending the first position data to a trained machine learning-based classifier; receiving the second position data from the trained machine learning-based classifier; and formulating the first prompt based on the second position data received from the trained machine learning-based classifier. An example 13 includes the subject matter of any of examples 1-12, further including: sending the first position data to a graph neural network; receiving the second position data from the graph neural network; and formulating the first prompt based on the second position data received from the graph neural network. An example 14 includes the subject matter of any of examples 1-13, further including: sending a first version of at least one of the first position data or the second position data to the generative language model; receiving, from the generative language model, a second version of the at least one of the first position data or the second position data; and formulating the first prompt based on the second version of the at least one of the first position data or the second position data. An example 15 includes the subject matter of any of examples 1-14, further including: applying a filter mechanism to the position description; and sending the position description to the user interface in response to output of the filter mechanism satisfying a filter criterion. An example 16 includes the subject matter of any of examples 1-15, further including: receiving, via the user interface, at least one edit to a first version of the first piece of writing; creating a second version of the first piece of writing based on the at least one edit; determining a difference between the first version of the first piece of writing and the second version of the first piece of writing; formulating feedback based on the difference between the first version of the first piece of writing and the second version of the first piece of writing; and based on the feedback, at least one of (i) formulating a second version of the first prompt or (ii) training the generative language model. An example 17 includes the subject matter of any of examples 1-16, further including: distributing the first piece of writing via the user connection network; via the user connection network; receiving feedback in response to the distribution of the first piece of writing; and based on the feedback, at least one of (i) formulating a second version of the first prompt or (ii) training the generative language model. An example 18 includes the subject matter of any of examples 1-17, where the user connection network includes a plurality of web pages that are accessible to and capable of being viewed by users of the user connection network via a connection graph including nodes that represent the users and edges that represent connections between the users or relationships between the users.

A system includes: at least one processor; and at least one memory coupled to the at least one processor; where the at least one memory includes instructions that, when executed by the at least one processor, cause the at least one processor to perform operations including any of the above examples. A non-transitory computer readable medium includes at least one memory capable of being coupled to at least one processor; where the at least one memory includes instructions that, when executed by the at least one processor, cause the at least one processor to perform operations including any of the above examples.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

receiving, via a user interface, first position data associated with a first user of a user connection network, wherein the user connection network includes an entity profile of the first user;

identifying a subset of the user connection network using the first position data and the entity profile of the first user;

extracting second position data from the identified subset of the user connection network based on the first position data;

determining inferred position-related data using the second position data, wherein the inferred position-related data comprises correlations between skill keywords and job titles, and confidence values for the correlations;

selecting a prompt template using the first position data and the second position data;

using the prompt template to formulate a first prompt, wherein the first prompt comprises at least one natural language instruction, wherein the at least one natural language instruction causes a generative language model to generate a job description based on the first position data, the inferred position-related data, and the confidence values;

sending the first prompt including the at least one natural language instruction to the generative language model;

receiving, from the generative language model, a first piece of content, wherein the first piece of content comprises a position description output by the generative language model based on that at least one natural language instruction of the first prompt; and sending the position description to the user interface in response to the first position data.

2. The method of claim 1, wherein the first position data comprises at least one of a job title or a company description, and the second position data comprises at least one skill keyword.

3. The method of claim 1, further comprising validating the first position data by:

searching at least one data store for a standardized job title that matches the first position data;

retrieving, from the at least one data store, the standardized job title that matches the first position data; and replacing the first position data with the standardized job title.

4. The method of claim 1, further comprising:

searching at least one data store associated with the user connection network for a position template associated with the first user and the first position data; and generating and sending the position description to the user interface in response to not finding the position template in the searched at least one data store.

5. The method of claim 1, further comprising:

extracting third position data from a first user profile associated with the first user of the user connection network, wherein the third position data is different from the first position data and the second position data.

6. The method of claim 5, further comprising validating the third position data by:

extracting a company name from the first user profile;

searching at least one data store associated with the user connection network for a company profile associated with the extracted company name; and finding, in the at least one data store associated with the user connection network, the company profile associated with the company name.

7. The method of claim 1, wherein a connection graph associated with the user connection network is updated in response to a user interaction with the user connection network, and the second position data is extracted from the updated connection graph.

8. The method of claim 1, further comprising:

searching the user connection network for user profiles that match the first position data;

retrieving, from the user connection network, at least one user profile that matches, based on a comparison of a measure of textual similarity to a threshold level of similarity, the first position data;

receiving a selection of a user profile of the retrieved at least one user profile that matches the first position data;

extracting, from the selected user profile, additional second position data different from the second position data;

formulating a second prompt different from the first prompt based on the additional second position data;

sending the second prompt to the generative language model;

receiving, from the generative language model, a second piece of content, wherein the second piece of content comprises a second position description output by the generative language model based on the second prompt;

sending, to the user interface, an instruction to replace the first piece of content with the second piece of content.

9. The method of claim 1, further comprising:

searching the user connection network for user profiles that match the first position data;

retrieving, from the user connection network, at least one user profile that matches the first position data;

receiving a selection of a user profile of the retrieved at least one user profile that matches the first position data;

extracting, from the selected user profile, additional second position data different from the second position data; and formulating the first prompt based on the additional second position data.

10. The method of claim 1, further comprising:

generating statistical correlations between skill keywords listed in profiles associated with user interactions with job postings via the user connection network and skill keywords listed in the job postings;

identifying at least one skill keyword based on the statistical correlations; and formulating the first prompt based on the at least one skill keyword identified based on the statistical correlations.

11. The method of claim 1, further comprising:

sending the first position data to a trained machine learning-based classifier;

receiving the second position data from the trained machine learning-based classifier; and formulating the first prompt based on the second position data received from the trained machine learning-based classifier.

12. The method of claim 1, further comprising:

sending the first position data to a graph neural network;

receiving the second position data from the graph neural network; and formulating the first prompt based on the second position data received from the graph neural network.

13. The method of claim 1, further comprising:

sending a first version of at least one of the first position data or the second position data to the generative language model;

receiving, from the generative language model, a second version of the at least one of the first position data or the second position data; and formulating the first prompt based on the second version of the at least one of the first position data or the second position data.

14. The method of claim 1, further comprising:

applying a filter mechanism to the position description; and sending the position description to the user interface in response to output of the filter mechanism satisfying a filter criterion.

15. The method of claim 1, further comprising:

receiving, via the user interface, at least one edit to a first version of the first piece of content;

creating a second version of the first piece of content based on the at least one edit;

determining a difference between the first version of the first piece of content and the second version of the first piece of content;

formulating feedback based on the difference between the first version of the first piece of content and the second version of the first piece of content; and based on the feedback, at least one of (i) formulating a second version of the first prompt or (ii) training the generative language model.

16. The method of claim 1, further comprising:

distributing the first piece of content via the user connection network;

via the user connection network, receiving feedback in response to the distribution of the first piece of content; and based on the feedback, at least one of (i) formulating a second version of the first prompt or (ii) training the generative language model.

17. A system, comprising:

at least one processor; and at least one memory coupled to the at least one processor, wherein the at least one memory comprises at least one instruction that, when executed by the at least one processor, causes the at least one processor to perform at least one operation comprising:

receiving, via a user interface, first position data associated with a first user of a user connection network, wherein the user connection network includes an entity profile of the first user;

identifying a subset of the user connection network using the first position data and the entity profile of the first user;

extracting, second position data from the identified subset of the user connection network based on the first position data;

determining inferred position-related data using the second position data, wherein the inferred position-related data comprises correlations between skill keywords and job titles, and confidence values for the correlations;

selecting a prompt template using the first position data and the second position data;

using the prompt template to formulate a first prompt, wherein the first prompt comprises at least one natural language instruction, wherein the at least one natural language instruction causes a generative language model to generate a job description based on the first position data, the inferred position-related data, and the confidence values;

sending the first prompt including the at least one natural language instruction to the generative language model;

receiving, from the generative language model, a first piece of content, wherein the first piece of content comprises a position description output by the generative language model based on that at least one natural language instruction of the first prompt; and sending the position description to the user interface in response to the first position data.

18. The system of claim 17, wherein the at least one instruction, when executed by the at least one processor, further causes the at least one processor to perform at least one operation comprising:

searching the user connection network for user profiles that match the first position data;

retrieving, from the user connection network, at least one user profile that matches, based on a comparison of a measure of textual similarity to a threshold level of similarity, the first position data;

receiving a selection of a user profile of the retrieved at least one user profile that matches the first position data;

extracting, from the selected user profile, additional second position data different from the second position data;

formulating a second prompt different from the first prompt based on the additional second position data;

sending the second prompt to the generative language model;

receiving, from the generative language model, a second piece of content, wherein the second piece of content comprises a second position description output by the generative language model based on the second prompt;

sending, to the user interface, an instruction to replace the first piece of content with the second piece of content.

19. At least one non-transitory machine-readable storage medium comprising at least one instruction that, when executed by at least one processor, causes the at least one processor to perform at least one operation comprising:

receiving, via a user interface, first position data associated with a first user of a user connection network, wherein the user connection network includes an entity profile of the first user;

identifying a subset of the user connection network using the first position data and the entity profile of the first user;

extracting, second position data from the identified subset of the user connection network based on the first position data;

determining inferred position-related data using the second position data, wherein the inferred position-related data comprises correlations between skill keywords and job titles, and confidence values for the correlations;

selecting a prompt template using the first position data and the second position data;

using the prompt template to formulate a first prompt, wherein the first prompt comprises at least one natural language instruction, wherein the at least one natural language instruction causes a generative language model to generate a job description based on the first position data, the inferred position-related data, and the confidence values;

sending the first prompt including the at least one natural language instruction to the generative language model;

receiving, from the generative language model, a first piece of content, wherein the first piece of content comprises a position description output by the generative language model based on that at least one natural language instruction of the first prompt; and sending the position description to the user interface in response to the first position data.

20. The at least one non-transitory machine-readable storage medium of claim 19, wherein the at least one instruction, when executed by the at least one processor, further causes the at least one processor to perform at least one operation comprising:

searching the user connection network for user profiles that match the first position data;

retrieving, from the user connection network, at least one user profile that matches the first position data;

receiving a selection of a user profile of the retrieved at least one user profile that matches the first position data;

extracting, from the selected user profile, additional second position data different from the second position data; and formulating the first prompt based on the additional second position data.

* * * * *